(12) United States Patent
Kalmakis et al.

(10) Patent No.: US 8,033,188 B2
(45) Date of Patent: *Oct. 11, 2011

(54) PIPETTOR SOFTWARE INTERFACE

(75) Inventors: George Kalmakis, Gloucester, MA (US); Gary Nelson, Hollis, NH (US); Gregory Mathus, Concord, MA (US); Terrence Kelly, Lowell, MA (US); Joel Novak, Sudbury, MA (US); Kenneth Steiner, Sudbury, MA (US); Jonathan Finger, Arlington, MA (US)

(73) Assignee: Integra Biosciences Corp., Hudson, NH (US)

( * ) Notice: Subject to any disclaimer, the term of this patent is extended or adjusted under 35 U.S.C. 154(b) by 855 days.

This patent is subject to a terminal disclaimer.

(21) Appl. No.: 11/856,232

(22) Filed: Sep. 17, 2007

(65) Prior Publication Data
US 2009/0074622 A1 Mar. 19, 2009

(51) Int. Cl.
*G01N 1/14* (2006.01)
*B01L 3/02* (2006.01)
*G01F 19/00* (2006.01)

(52) U.S. Cl. .............. 73/864.11; 422/400; 422/501; 73/863.32; 73/864.13; 73/1.74; 73/864.01

(58) Field of Classification Search .............. None
See application file for complete search history.

(56) References Cited

U.S. PATENT DOCUMENTS

| | | | |
|---|---|---|---|
| 4,567,780 A | 2/1986 | Oppenlander et al. | |
| 4,821,586 A | 4/1989 | Scordato et al. | |
| 4,905,526 A | 3/1990 | Magnussen, Jr. et al. | |
| 5,090,255 A | 2/1992 | Kenney | |
| 5,187,990 A | 2/1993 | Magnussen, Jr. et al. | |
| 6,090,348 A | 7/2000 | Steele et al. | |
| 6,254,832 B1 | 7/2001 | Rainin et al. | |
| 6,299,841 B1 | 10/2001 | Rainin et al. | |
| 6,428,750 B1 | 8/2002 | Rainin et al. | |
| 6,841,129 B2 | 1/2005 | Braun et al. | |
| 7,046,230 B2 | 5/2006 | Zadesky et al. | |
| 7,499,040 B2 * | 3/2009 | Zadesky et al. | 345/204 |
| 7,540,205 B2 | 6/2009 | Nelson et al. | |
| 2005/0118069 A1 | 6/2005 | Solotareff et al. | |
| 2006/0027033 A1 | 2/2006 | Cote et al. | |
| 2007/0152983 A1 | 7/2007 | McKillop et al. | |
| 2008/0095671 A1 | 4/2008 | Mathus et al. | |
| 2008/0238879 A1 * | 10/2008 | Jaeger et al. | 345/173 |
| 2009/0071267 A1 | 3/2009 | Mathus et al. | |

FOREIGN PATENT DOCUMENTS

| | | |
|---|---|---|
| DE | 09406304 U1 | 6/1994 |
| WO | 03/036457 A2 | 5/2003 |
| WO | 2005/052781 A2 | 6/2005 |

(Continued)

OTHER PUBLICATIONS

PCT Office Communication dated Jan. 29, 2009.

(Continued)

*Primary Examiner* — Brian J Sines
*Assistant Examiner* — Jennifer Wecker
(74) *Attorney, Agent, or Firm* — Andrus, Sceales, Starke & Sawall, LLP

(57) ABSTRACT

A hand-held electronic pipettor includes menu driven software for controlling the information displayed on the user interface display, for inputting information to program the pipettor and for controlling the operation of the pipettor.

14 Claims, 14 Drawing Sheets

FOREIGN PATENT DOCUMENTS

| | | |
|---|---|---|
| WO | 2005/079987 A1 | 9/2005 |
| WO | 2005/079989 A1 | 9/2005 |
| WO | WO 2005079989 A1 * | 9/2005 |
| WO | 2005/121780 A2 | 12/2005 |
| WO | WO 2005121780 A2 * | 12/2005 |
| WO | 2006/028399 A1 | 3/2006 |

OTHER PUBLICATIONS

"Pipetman Concept", Gilson, Aug. 2005.

* cited by examiner

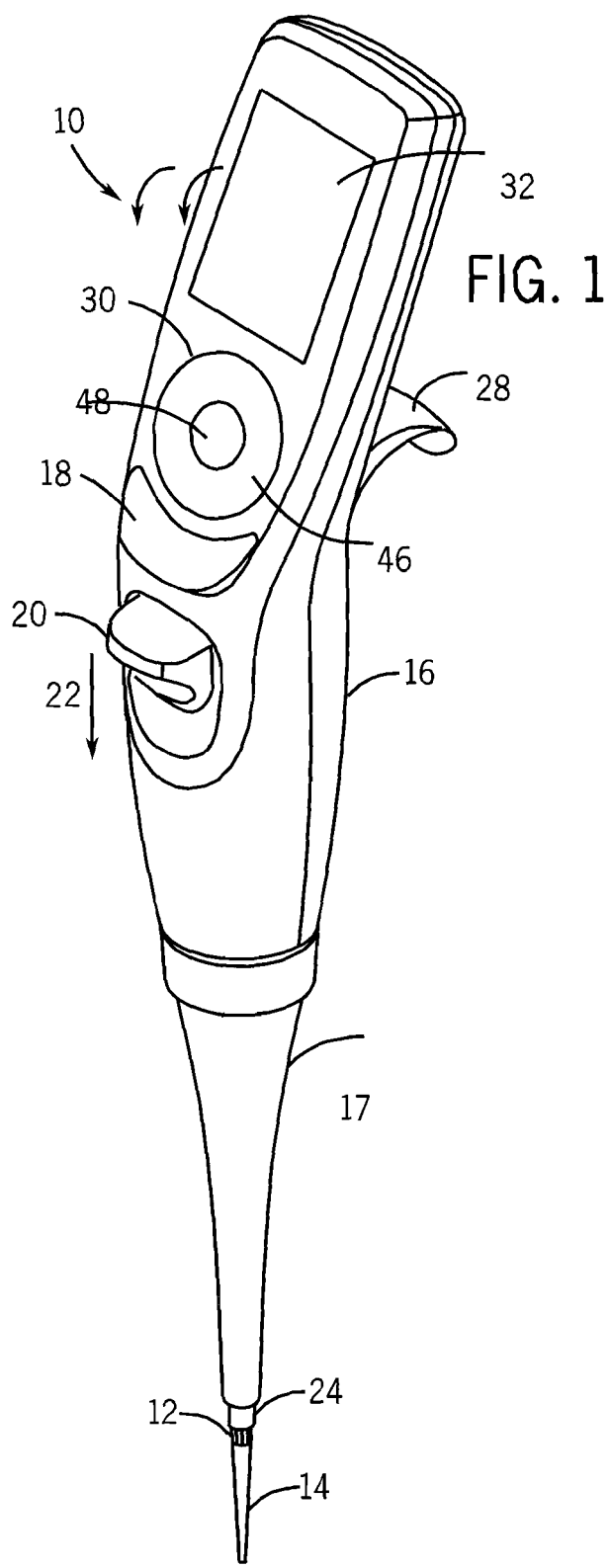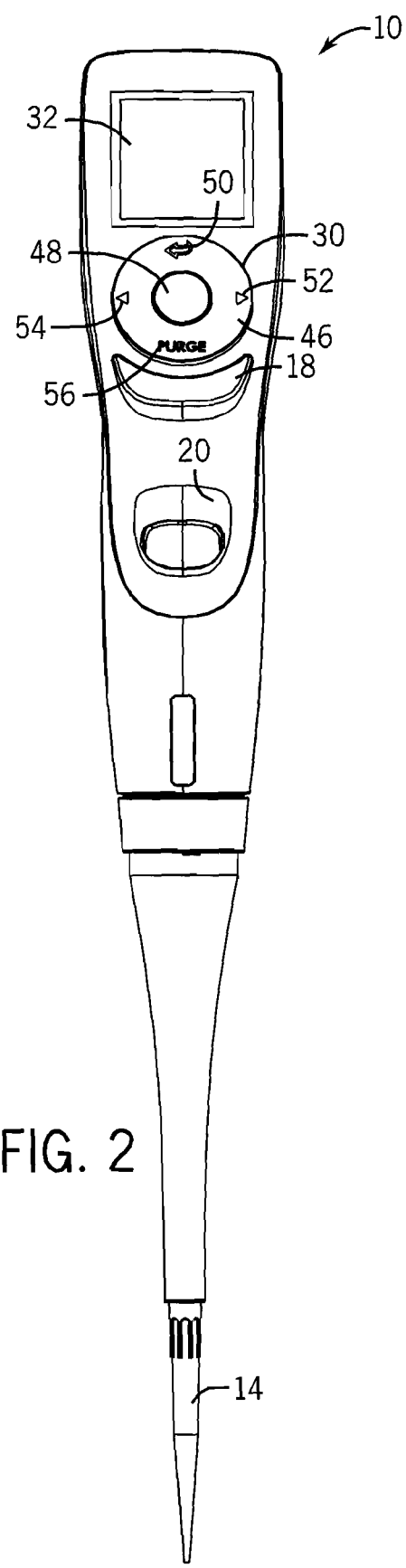
FIG. 1
FIG. 2

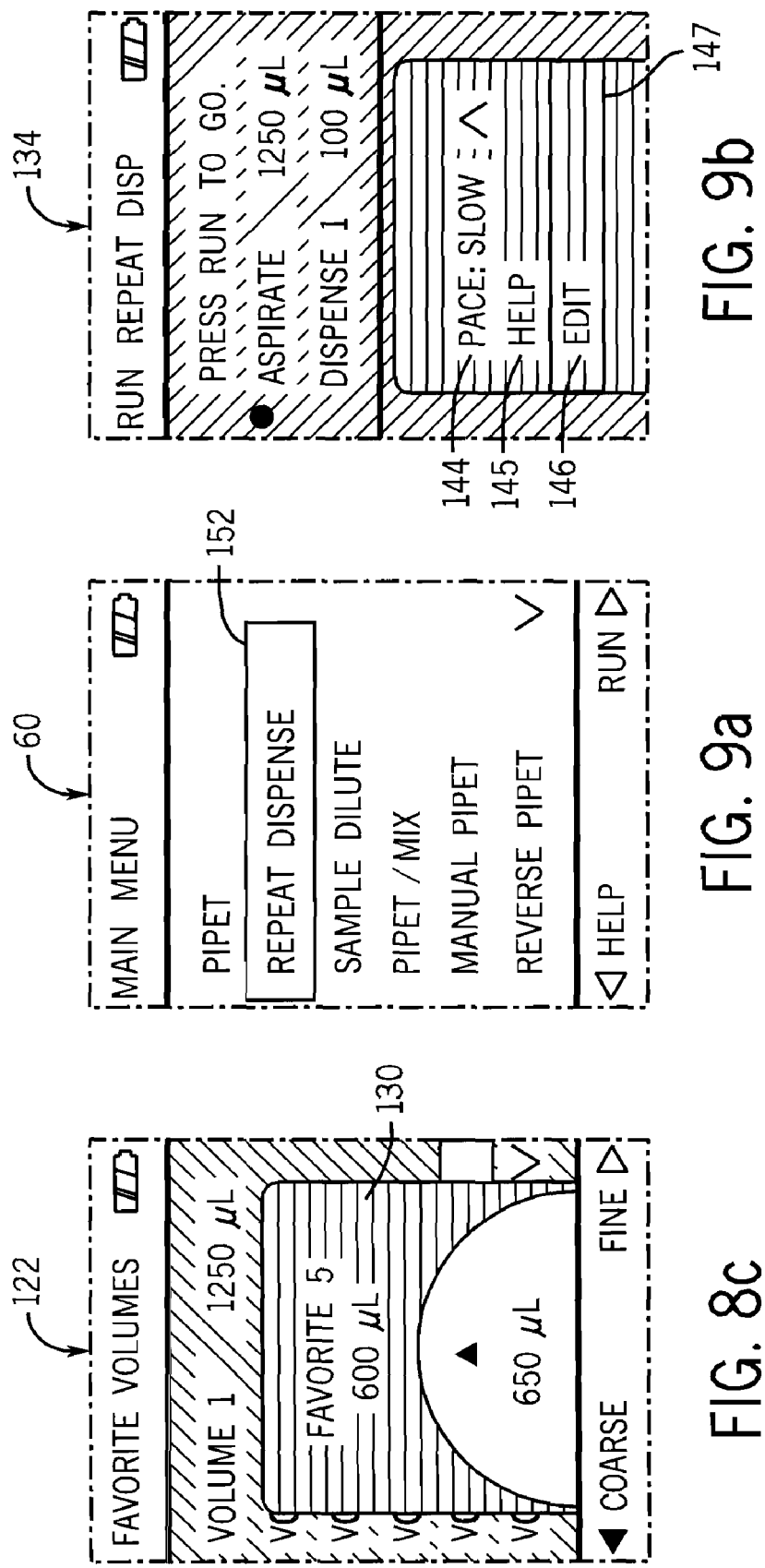

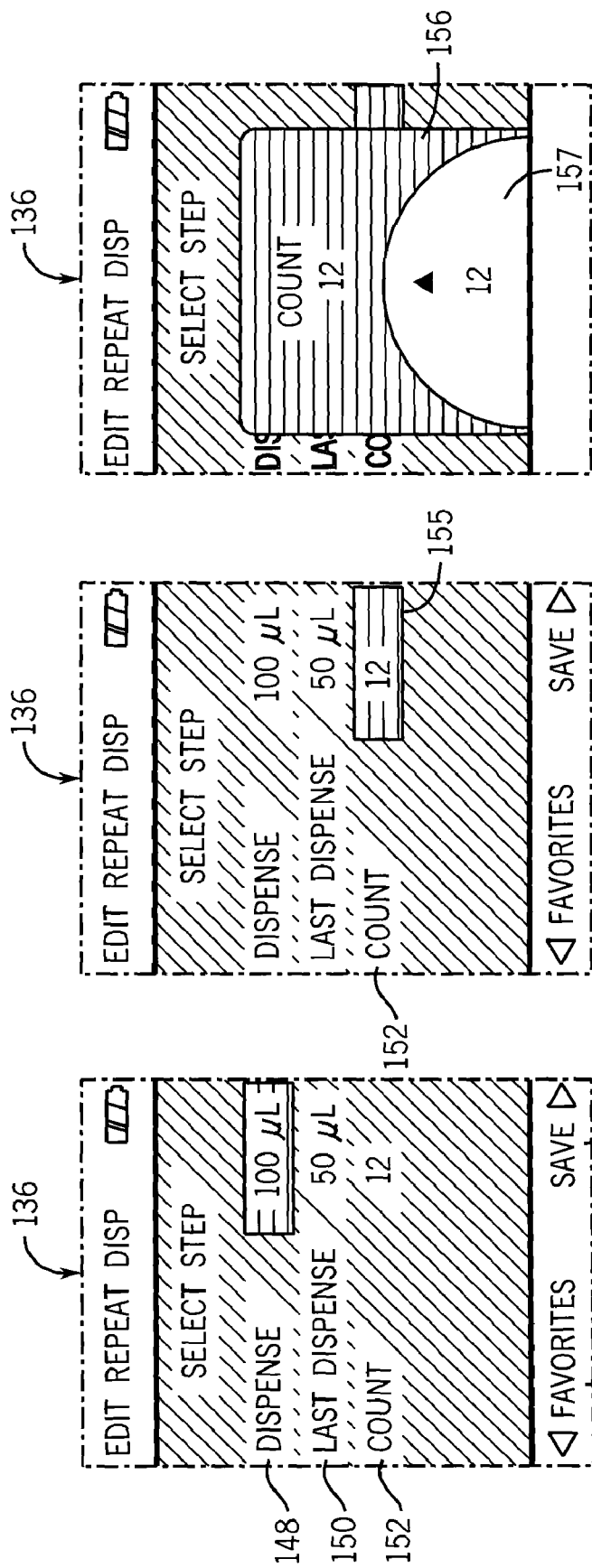

PIPETTOR SOFTWARE INTERFACE

FIELD OF THE INVENTION

The invention pertains to hand-held electronic pipettors, and in particular software for controlling information displayed on a user interface display on the pipettor and for programming a microcomputer that controls the operation of the pipettor.

BACKGROUND OF THE INVENTION

The use of hand-held electronic pipettors is widespread in laboratories. Electronic pipettors are typically controlled by small microprocessors located within the pipettor housing and are programmed through the use of a user interface on the pipettor itself. Such interfaces typically include keys pads, switches or dials, and many electronic pipettors have a small screen display as well. Generally speaking, users program electronic pipettors to aspirate a selected volume of liquid reagent or sample and to dispense the aspirated volume sometimes as a series of aliquots in successive dispensing operations. Programmable electronic pipettors can also be configured to do more complex operations such as mixing, repeat pipetting, diluting, etc.

The electronics industry has seen many advances in recent years. For example, small-scaled LCD displays with improved clarity and enhanced color graphic capability, improved processing and memory capabilities, wireless communication devices, etc., are all prevalent.

With advancements in electronics such as improved computing and processing capabilities, it has become desirable to program a wide variety of pipetting procedures directly into the pipettor. On the other hand, the addition of such capabilities adds a significant amount of complexity for the users of such pipettors.

An object of the invention is to provide a pipettor operating system with a practical user interface that is intuitive, even for first time users, yet sufficiently powerful to allow users to accomplish a wide range of laboratory pipetting procedures.

Another object of the invention is to facilitate programming, and in particular, one-handed programming of electronic pipettors.

A further object of the invention is to provide software tools that ease pipettor programming, and provide operational feedback to the user.

SUMMARY OF THE INVENTION

The invention is a hand-held electronic pipettor with a menu-driven user interface that is convenient and intuitive for programming the microprocessor on the pipettor, yet is sufficiently powerful to allow users to accomplish a wide range of laboratory pipetting procedures. In a first aspect of the invention, a circular touch pad on the pipettor is used to navigate menu-driven software on the pipettor. The circular touch pad translates rotational movements of a thumb or finger into up and down cursor movements on a display on the pipettor, e.g., by sensing the location of the thumb or finger with a flexible capacitance sensor under the top surface of the touch pad. The preferred pipettor also includes an enter button, as well as four selector locations spaced around the circular touch pad. Individual dedicated switches associated with each of the four selector locations and the enter button can be activated by the user to maneuver through the menu-driven software in an efficient manner. Preferably, the four selector locations on the circular touch include a back button which instructs the software to return to a previous menu or previously displayed information, right and left navigation buttons which typically allow the user to navigate more efficiently by following short cut instructions on the screen display, and a purge button which allows the user to initiate a purge sequence in case the user desires to prematurely end a procedure. The preferred pipettor also includes a separate run button and dedicated switch which is used to initiate pipetting routines or steps once the pipettor is fully programmed. Within the run mode, it is preferable that the screen displays the steps in the procedure on a scrolling basis. Preferably, the step that is waiting to be executed upon the pressing of the run button is emphasized or highlighted, the next or following step is listed below the current step, and when appropriate the step just executed is listed above the current step.

The software also preferably provides graphic displays for adjusting volume, relative pipetting speed, pace, and count for the various programmed pipetting procedures. Preferably, a pop up menu is shown on the display with a graphical gauge having a pointer. The user can manipulate the position of the pointer between the full ranges of selections available for the procedure using the circular touch pad. For example, when setting aspiration volume, dispense volume, or a last dispense volume, the user can use the touch pad control to move the pointer on the graphical display of the gauge anywhere in the range between a minimum value to a maximum value for the pipettor. For volume selection, it is preferred that the graphical gauge have a coarse setting and a fine setting, where the user can navigate the entire range of available volumes with less revolutions using the coarse setting than the fine setting. Preferably, the user can navigate the entire range of available volumes in less than 3½ rotations of the circular touch pad when using the coarse setting. It is also preferred that the software be programmed to store one or more favorite volume selections in memory to be retrieved by the user for later use.

As mentioned, it is also preferred that relative pipetting speed be able to be programmed using a graphical gauge and the circular touch pad. Preferably. the user is able to select preferably on a scale of 1 to 10, the relative pipetting speed at which the microprocessor controls the operation of the pipettor during the program routines. In this regard, the microprocessor operates the pipettor in accordance with the description in co-pending U.S. patent application entitled "Electronic Pipettor Assembly", now U.S. Pat. No. 7,540,205 entitled "Electronic Pipettor", incorporated herein by reference and assigned to the assignee of the present application and filed on even date herewith. Also, as mentioned, the software preferably provides a gauge for setting the pace, i.e., the amount of time duration between repeating dispenses when the run button is continually activated. Preferably, there are four pace selections, none, slow, medium and fast which are graphically displayed and can be selected or edited by the user using the touchpad control. In addition, a total count value for successive aspirating or dispensing steps for a given procedure are preferably displayed graphically on the user interface, and can be selected or edited via the touchpad control. It has been found advantageous to set speed and pace globally, so that changes to speed and pace affect all operating procedures similarly until changed. In addition, it is preferred that a "help" function be available globally as well.

In another aspect of the invention, the menu driven software not only controls information displayed on the user interface and the information input to the microprocessor to operate the pipettor, but it also provides at least one and preferably multiple programmable pipetting modes based on predetermined algorithms, while at the same time provides the ability to create editable custom pipetting routines. The preferred modes based on predetermined algorithms include pipet, repeat dispense, sample dilute, pipet/mix, manual pipet, reverse pipet, variable dispense, variable aspirate, sample dilute/mix, and serial dilution. These ten functional modes based on predetermined algorithms are embedded in the software to implement respective well-known pipetting procedures, although various parameters such as volume, speed, pace, count, direction and mixing are available for programming and editing for the user. Notably, many of the preferred functional modes are programmed to include an inputted or calculated volume specific to the last aliquot in a series of dispensed aliquots. Use of a last dispense aliquot can be helpful for isolating pipetting errors from previous aliquots. As mentioned, some variables such as speed and pace are changed globally in the pipettor to apply to each of these modes, whereas other parameters such as volume parameters are edited specifically with respect to the individual modes. A more complete description of the functional modes based on predetermined algorithms is included in the "Detailed Description of the Invention", but it should be understood that the invention is not necessarily limited to the use of these functional modes. Preferably, each of these functional modes is available on a main menu displayed on the pipettor from which an individual mode can be selected for programming, editing and running. If desired, the pipettor preferably allows the user to remove one or more of these functional modes from the main menu.

On the other hand, the preferred pipettor also includes a custom programming mode in which the user can create custom pipetting procedures based on the steps of aspirating, mixing, dispensing and purging. The preferred pipettor allows the user to create and store a number of custom programs in memory, e.g. up to ten custom programs, each containing no more than a preferred predetermined maximum number of steps, e.g., 50 verifiable steps. The custom programs can later be accessed by the user through the main menu, and, then preferably through a main custom menu, to run the custom routines as desired by the user.

The preferred handheld electronic pipettor also includes additional features such as an error checking routine that displays an error message when program functions exceed predetermined volume limits. While the preferred error checking routine will not allow the user to save an illegal program, it does allow the user to continue programming even if the then entered parameters are illegal. Preferably, the displayed error message changes to a save prompt or the like when the error checking routine determines that the programmed routine is legal. Error checking is preferably available both for the functional modes based on predetermined algorithms and for custom programs.

In another aspect of the invention, the software uses color coding on the screens displayed on the pipettor to help the user intuitively recognize the status of the pipettor. For example, the background color for run screens is consistent for all functional modes and is different from the background color for the edit screens, and from the background color for the help screens.

Another feature of the preferred handheld electronic pipettor is the use of a programmable start up screen which flashes upon start up. Such a start up screen can contain a manufacturer's logo or system identification information, or personalized pictures or information.

Other aspects and features of the invention should be apparent to those skilled in the art upon reviewing the drawings and following description thereof.

BRIEF DESCRIPTION OF THE DRAWINGS

FIG. 1 is a perspective view of a hand-held electronic pipettor having a user interface and a programmable microprocessor that is programmed with menu-driven software in accordance with a preferred embodiment of the invention.

FIG. 2 is a front elevational view of the pipettor shown in FIG. 1.

FIGS. 8A-8C illustrate programming screens for setting and selecting "favorite" volumes in accordance with the preferred embodiment of the invention.

FIGS. 9A-9H illustrate programming screens relating to the "REPEAT DISPENSE" mode.

DETAILED DESCRIPTION OF THE INVENTION

Figure 3B:
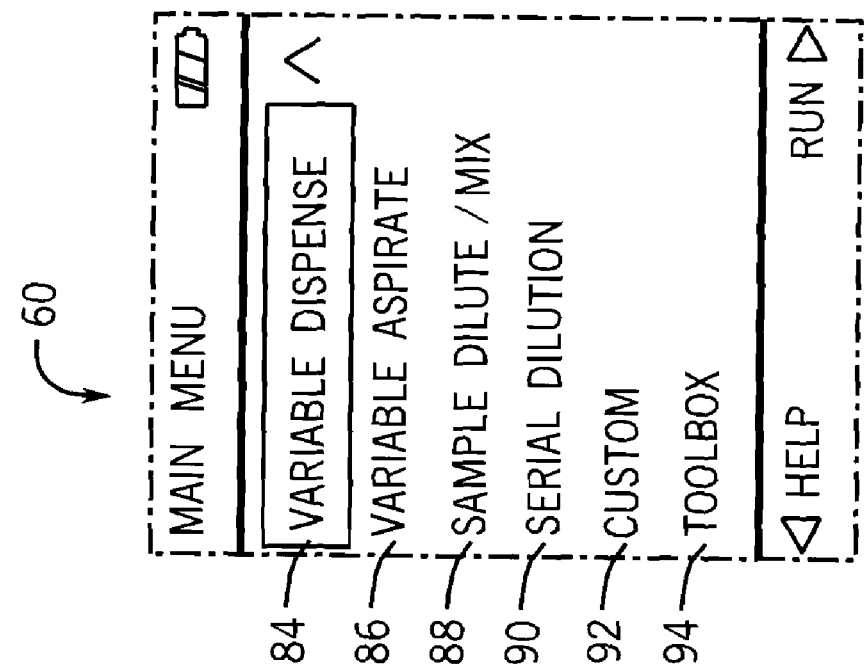
FIGS. 3A and 3B show a main-menu programming screen in accordance with the preferred embodiment of the invention.

The present invention is directed to menu-driven software for controlling information displayed on the user interface display of a pipettor 10 and for programming the microprocessor to operate the pipettor 10. In the preferred embodiment of the invention, the software is used on a pipettor 10 as shown in FIG. 1. FIG. 1 shows a single channel pipettor 10 constructed in accordance with co-pending patent application, application Ser. No. 11/856,231, entitled "Electronic Pipettor Assembly", assigned to the assignee of the present application and filed on even date herewith, which is incorporated herein by reference: now U.S. Pat. No. 7,540,205 entitled "Electronic Pipettor", by Nelson et al. and issuing on Jun. 2, 2009 and divisional application, application Ser. No. 12/422,236, entitled "Electronic Pipettor with Improved Accuracy", filed on Apr. 13, 2009. While FIG. 1 shows a single channel pipettor 10, it should be understood that may aspects of the invention can be applied to multi-channel pipettors as well. As will be described in more detail later, the single channel pipettor 10 shown in FIG. 1 is a hand-held electronic pipettor which is programmable by the user to aspirate and dispense liquid samples or reagents, or to accomplish a variety of other pipetting functions as described in general below.

The hand-held pipettor 10 in FIG. 1 includes a mounting shaft 12 onto which a disposable pipette tip 14 is mounted as known in the art. Although not shown in the drawings, the pipettor 10 includes an aspiration cylinder and a piston that is driven by a motor. The pipettor 10 has an elongated body consisting of an upper portion 16 and a lower portion 17. The aspiration cylinder and piston reside in the lower portion 17. A finger hook 28 is located on the rear side of the upper portion 16 of the pipettor 10. The upper portion 16 of the pipettor 10 is designed to be held in the hand of a user, in the user's palm, with the user's index finger residing against the bottom surface of the finger hook 28 and the user's thumb available to operate controls on the front side of the pipettor 10. Alternatively, the user can conveniently use a finger on the opposite hand to program the pipettor 10.

In the preferred embodiment, the front side of the pipettor 10 includes a touch pad control 30, a run button 18 located below the touch pad control 30, an ejector button 20 located below the run button 18, and a user interface display 32 located above the touch pad control 30. With the configuration show in FIG. 1, each of the touch pad control 30, run button 18, and ejector button 20 can be operated conveniently by the thumb of a user, thereby enabling convenient one-handed programming and operation (or, as mentioned, the user can use a finger on the opposite to program the pipettor). As will be described in much more detail below, the touch pad control 30 is used to control the pipettor 10 in accordance with menu-driven software controlling the information displayed on the user interface display 32 and providing an interface for programming the microprocessor to operate the pipettor. The run button 18 located below the touch pad control 30 is actuated by the user after the pipettor 10 has been programmed in order to run selected or custom developed pipetting procedures.

The ejector button 20 located below the run button 18 is actuated by the thumb of a user in the direction of arrow 22 to manually eject the disposable pipet tip 14 from the pipettor 10. More specifically, downward movement of the ejector button 10 activates an ejector mechanism which pushes the ejector sleeve 17 downward against a spring bias to engage the top of the pipette tip 14 and eject the tip 14 from the mounting shaft 12 on the pipettor 10. The preferred ejector mechanism is disclosed in co-pending U.S. patent application Ser. No. 11/856,193 entitled "Pipettor Pipette Tip Ejection Mechanism" filed on even date herewith. Sept. 17, 2007, assigned to the assignee of the present application and incorporated herein by reference. The preferred configuration for the mounting shaft 12 and the disposable pipet tip 14 are disclosed in co-pending U.S. patent application Ser. No. 11/552,384 entitled "Locking Pipette Tip and Mounting Shaft" which is assigned to the assignee of the present application and incorporated herein by reference, now U.S. Pat. No. 7,662,343, issuing on Feb. 16, 2010. It should be understood, however, that the features of the present invention need not be limited to the preferred ejection mechanism or the preferred configuration for the mounting shaft and pipet tips disclosed in the above-referenced, co-pending patent applications. In the preferred embodiment, the ejection mechanism is driven manually by the user actuated in the ejector button 20; whereas, the run button 18 and the touch pad control 30, on the other hand, provide electrical control or programming inputs.

Referring briefly to the incorporated application entitled "Electronic Pipettor Assembly", now U.S. Pat. No. 7,540,205, the pipettor 10 contains a microprocessor and preferably at least one megabyte of electrically erasable program or read-only memory, i.e. flash memory. The microprocessor in combination with the flash memory should allow ample memory storage for programming, calibration information, as well as animation or graphics on the screen display 32. The use of flash memory allows the storage of larger programs and data as well as the ability to reprogram or re-flash new software for future enhancements. For example, as described in the above incorporated patent application entitled "Electronic Pipettor Assembly", and divisional application Ser. No. 12/422,236, entitled "Electronic Pipettor with Improved Accuracy", use of flash memory allows the use of separate aspiration and dispensing look-up tables, thereby providing more accurate correlation of motor movements to both aspirate volumes and dispense volumes. The operating software for the pipettor 10 is preferably programmed using a combination of the c-programming language and assembly programming language.

The display 32 provides interactive user interface output for all pipettor programming actions, including indicators and help screens. The display 32 is preferably a backlit device to provide clear visibility even in low light conditions. The preferred display 32 is a color 128×128 pixel LCD display sized so that the distance across the diagonal is about 1.5 inches, as disclosed in the co-pending patent application "Electronic Pipettor Assembly:", now U.S. Pat. No. 7,540,205. The improved clarity of this LCD display allows the pipettor 10 to provide more complete information to the user, such as eliminating the need for abbreviations on the display and/or providing a meaningful hel function onboard the pipettor 10.

Navigation of the menus displayed on the user interface display 32 is accomplished using the touch pad control 30. The preferred touch pad control 30 includes a capacitance circular touch pad 46 and a central enter or "OK" button 48. The hardware configuration of the touch pad control 30 is described in and incorporated in co-pending patent application "Electronic Pipettor Assembly", now U.S. Pat. No. 7,540,205, and is not discussed in detail herein. However, as is known in the art, the touch pad control 30 is programmed to translate relative rotational movement into up and down scrolling movements on the screen display 32. For example, clockwise motion of the thumb or finger scrolls menu selections downward whereas counterclockwise motion of the thumb or finger scrolls menu selections upward. Further, the enter button 48 in the center of the touch pad control 30 is used to select the value highlighted on the display 32 per the rotational movement of the thumb or finger on the circular touch pad 46. As will be discussed in detail below, the "OK" button 48 is preferably used to select an item to be edited, or to implement other programming options. In addition, the preferred circular touch pad 46 also includes four other selector locations which are preferably labeled with symbols on the circular touch pad 46. The top of the circular touch pad 46 shows a "Go Back" symbol 50 which serves as a back button for menu selections. When a user presses and holds the back button 50 on the circular touch pad 46, the menu on the display 32 will go back to the previous menu or information displayed. The circular touch pad 46 also includes right and left navigation buttons 52, 54 respectively. Also, as mentioned below, the navigation buttons 52, 54 are often used in the preferred embodiment to implement features or options that may not be available to the user by scrolling through menu or sub menu options on the screen. The circular touch pad 46 also includes "purge" symbol 56. When the user presses and holds the purge button 56, the pipettor 10 will empty. In other words, the pipettor 10 is programmed to do a complete dispensing blow out when the user presses and holds the purge button 56. More specifically, it is preferred that pressing the purge button 56 will display a prompt on the display 32 for the user to press the run button 18 to proceed with purging. The purge button 56 allows the user to prematurely end a procedure, such as would be the case if the user wanted to re-start a procedure in the laboratory.

Figure 3A:
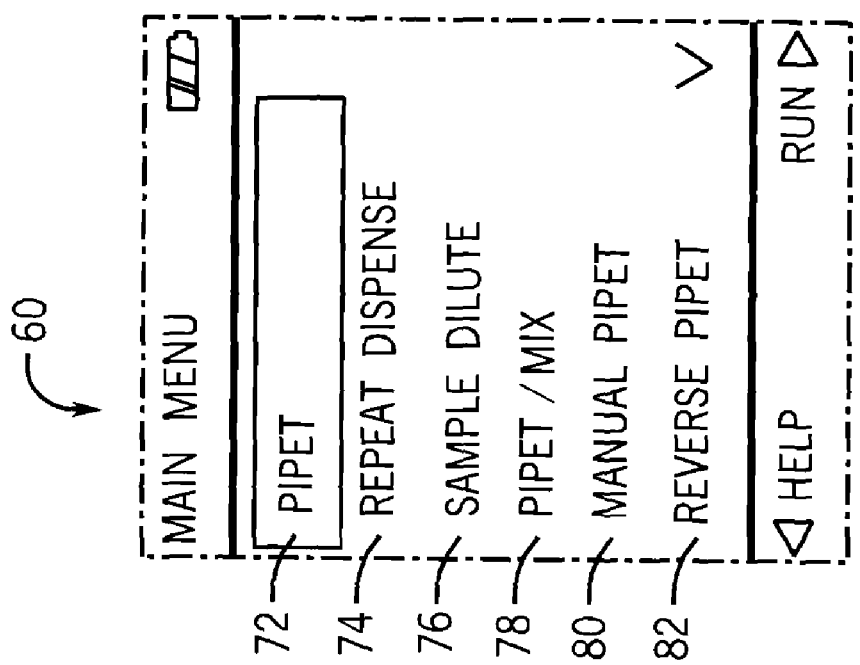

The main menu displayed on the LCD display 32 is shown in FIGS. 3A and 3B. The main menu screen 60 includes a scrollable listing of programmable pipet functions, including a variety of common pipetting modes 72, 74, 76, 78, 80, 82, 84, 86, 88, 90 with predefined algorithms and a custom programming option 92, as well as a toolbox option 94. Below the scrollable list of functions, the main menu screen 60 indicates that pressing the left navigation button 54, FIG. 2 selects the "HELP" option, whereas pressing the right navigation button 52, FIG. 2 selects the "RUN" option for the function highlighted in the list. The scrollable listing can be navigated up or down using the circular touch pad 46. FIG. 3A shows the menu screen 60 with the first six (6) listed functions 72, 74, 76, 78, 80, 82 and FIG. 3B shows the last six (6) listed functions 84, 86, 88, 90, 92, 94 on the main menu 60. In the preferred embodiment of the invention, there are ten (10) selectable functions with predefined algorithms which can be selected from the main menu 60, in addition to the custom programming option, and a toolbox option. A battery indicator 64 indicates the amount of power remaining in the rechargeable battery.

Figure 4A:
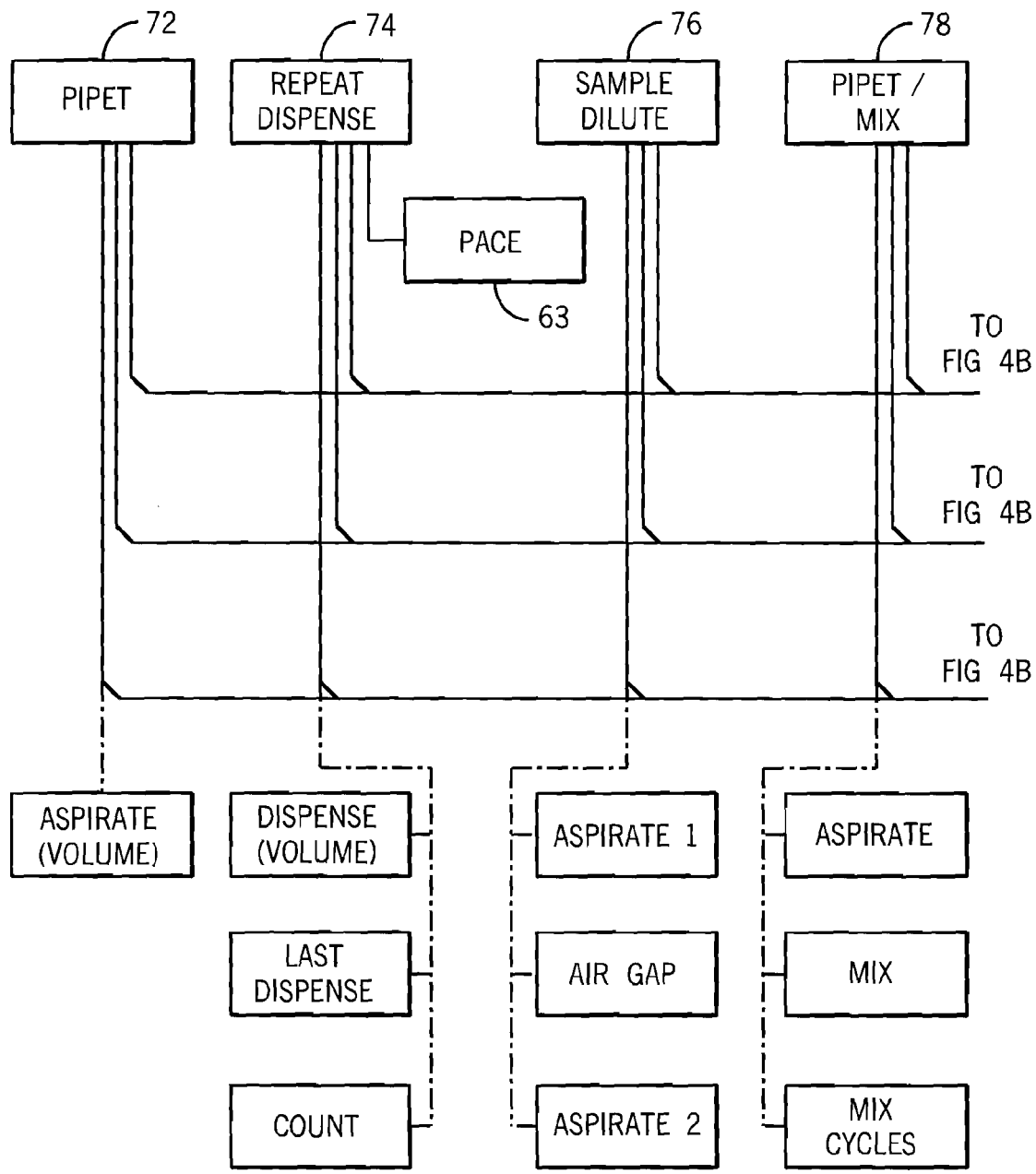
FIG. 4 is a flowchart providing a functional overview of menu-based software in accordance with a preferred embodiment of the invention, showing in particular selections for a variety of common pipetting modes with predefined algorithms and programmable options or variables corresponding to those modes, as well as other selections from the main menu, including a custom programming option and tool box option.
Figure 4B:
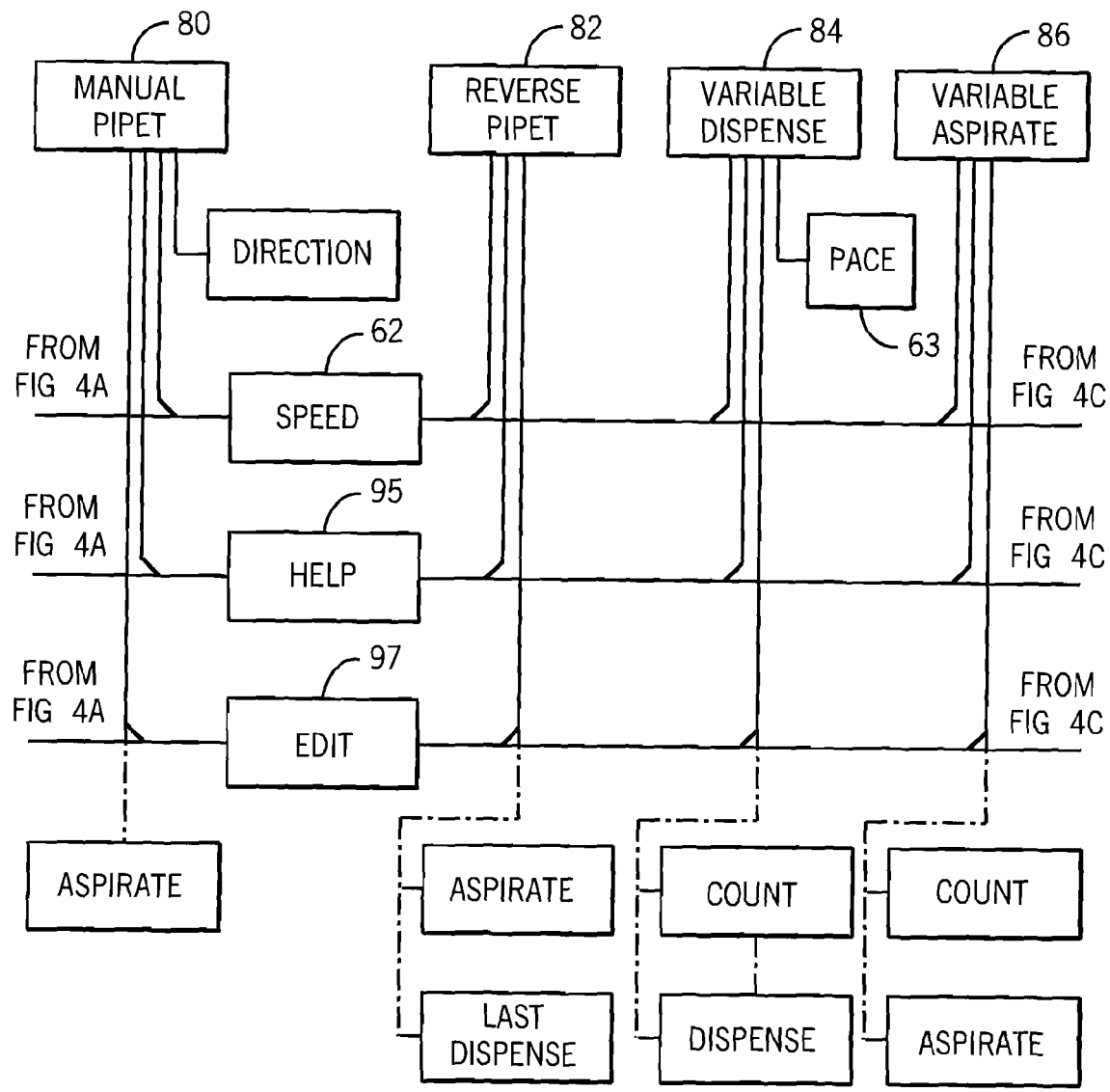
Figure 4C:
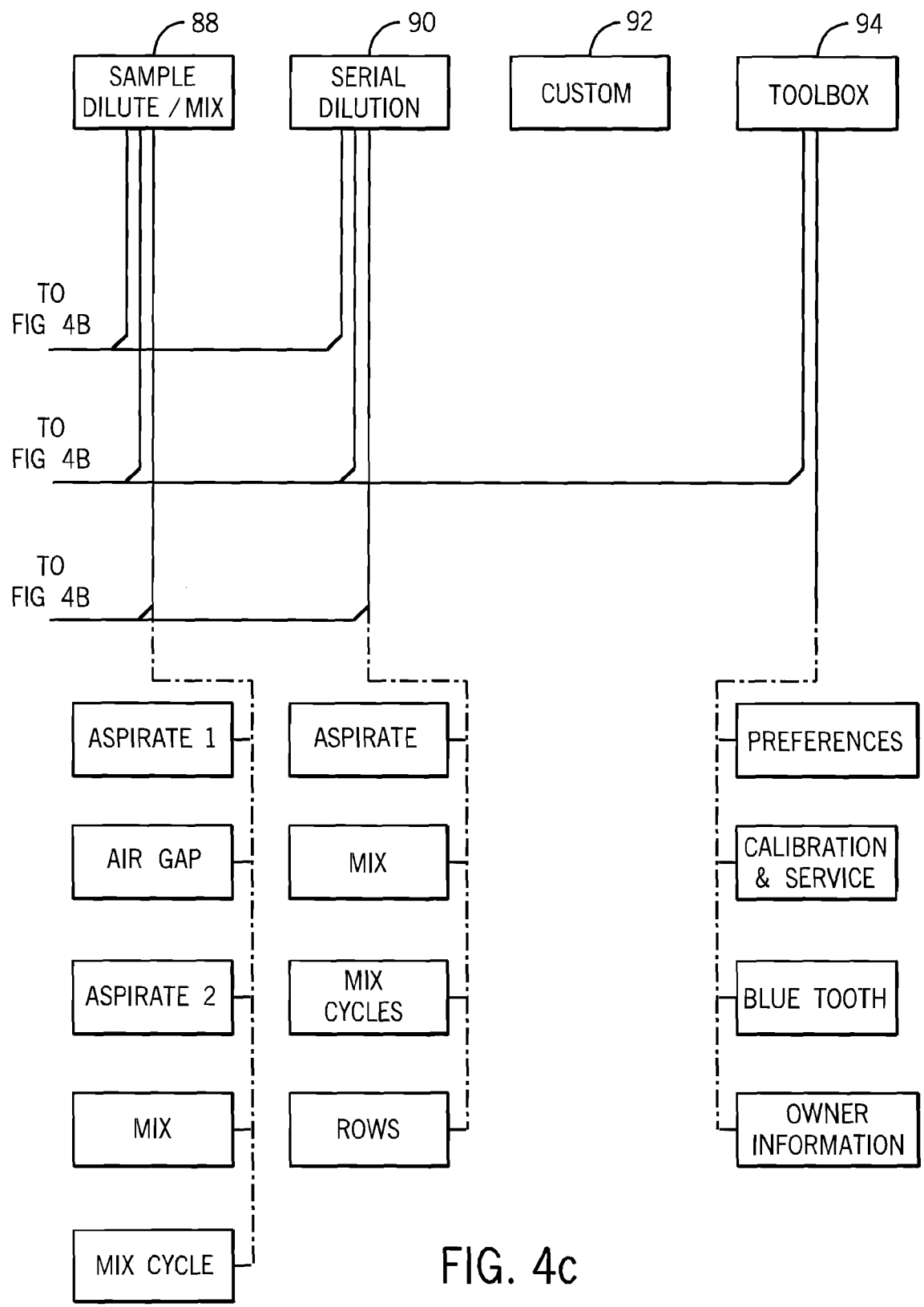

FIGS. 4A-C are a flow chart illustrating the selections from the main menu 60 as well as editable options associated with each of the selections 72, 74, 76, 78, 80, 82, 84, 86, 88, 90 and 94, with the exception with the custom programming option 92 which is described in connection with FIGS. 11A-11D and 12A-12C below. The listed pipetting modes 72, 74, 76, 78, 80, 82, 84, 86, 88 and 90 on the main menu 60 are based on predefined algorithms for common pipetting procedures. Briefly, the "PIPET" mode 72 is used for simple liquid transfers where the aspirate and dispense volumes are the same. The "REPEAT DISPENSE" mode 74 is used for repeated dispensing of a programmed volume of liquid. The "SAMPLE DILUTE" mode 76 is used to aspirate two different liquids in the same pipette tip keeping both liquids separated by an air gap (i.e., dilutant, air gap, and sample) followed by a complete dispense. The "PIPET/MIX" mode 78 is used for aspirating and dispensing identical volumes followed by a mixing routine. The "MANUAL PIPET" mode 80 is used when more operator control is required for aspirating and dispensing unknown volumes. In this mode, the software interface provides icons so that the user can toggle between aspirating and dispensing. The "REVERSE PIPET" mode 82 is similar to the "PIPET" mode 72 except there is no blow out between the last dispensing cycle and the next aspiration. This mode is used to add reagent into the tip without the introduction of air into the sample. The "VARIABLE DISPENSE" mode 84 is used for repeated dispensing of differing volumes. The "VARIABLE ASPIRATE" mode 86 is used for sequentially aspirating (in the same tip) more than one programmed volume followed by a single dispense. The "SAMPLE DILUTE/MIX" 88 mode is used for aspirating two different liquids in the same pipette tip keeping both liquids separated by an air gap (i.e. the dilutant, air gap, and sample) followed by a dispense and an immediate mix step. The "SERIAL DILUTION" mode 90 enables aspiration of a specific volume followed by a mix sequence and ending with the original aspirate volume in the tips. The various pipetting modes 72, 74, 76, 78, 80, 82, 84, 86, 88 and 90 are discussed in more detail below.

Referring generally to FIG. 4, various parameters such as volume, pipetting speed, pace, count, etc. . . . associated with each of the pipetting modes 72, 74, 76, 78, 80, 82, 84, 86, 88 and 90 are editable. FIG. 4, as well as Table 2 below, identifies the editable parameters for the predefined pipetting modes in the preferred embodiment.

Various features of the software are common across the different pipetting modes 72, 74, 76, 78, 80, 82, 84, 86, 88 and 90. For example, pipetting speed 62, FIG. 4b, is set globally for each of the pipetting modes. More specifically, speed for aspirating is set globally, as is dispensing speed, mixing speed, and purge speed when in a custom mode. The ability to set parameters globally is indicated in FIG. 4 by the solid lines connecting the respective pipetting modes 72, 74, 76, 78, 80, 82, 84, 86, 88, 90 directly to the block 91 labeled "SPEED". Similarly, pace 63, FIGS. 4a and 4b, is set globally, which is indicated by solid lines from the repeat dispense 74 mode and the variable dispense 84 mode being directed to blocks 63 labeled "PACE". Likewise, FIG. 4 illustrates that the help function can be accessed from any modes 72, 74, 76, 78, 80, 82, 84, 86, 88, 90 as illustrated by the solid lines directed to the block 95 labeled "HELP". On the other hand, editable parameters associated with each mode 72, 74, 76, 78, 80, 82, 84, 86, 88, 90 are generally different from one another, as indicated by the dotted lines in FIG. 4 dropping down below the solid lines leading to the box 97 labeled "EDIT". Various aspects of the invention will now be explained in the context of the various pipetting modes 72, 74, 76, 78, 80, 82, 84, 86, 88 and 90.

Referring in particular to the "PIPET" mode 72, this mode is used for quick or "neat" transfer of liquid between tubes, vials and microwell plates. In the "PIPET" mode 72, the full aspirated volume is dispensed, as mentioned above. When the "PIPET" mode 72 is selected from the main menu 60, the Run Pipette screen 96 shown in FIG. 5A is displayed. The Run Pipette screen 96 includes the instruction "press RUN" to go, which means that the user should press the RUN button 18 on the pipettor 10, FIGS. 1 and 2, to initiate pipetting steps as programmed, namely the aspirating and dispensing steps. During dispense, pressing and holding the RUN button 18 performs a two-step blow out (i.e., initial blow out occurs with tip in liquid, but the piston does not automatically return home until the user releases the RUN button 18 to allow the user time to remove the tip from the liquid and avoid aspirating liquid back into the tip.) The tip can then be ejected.

Figure 5B:
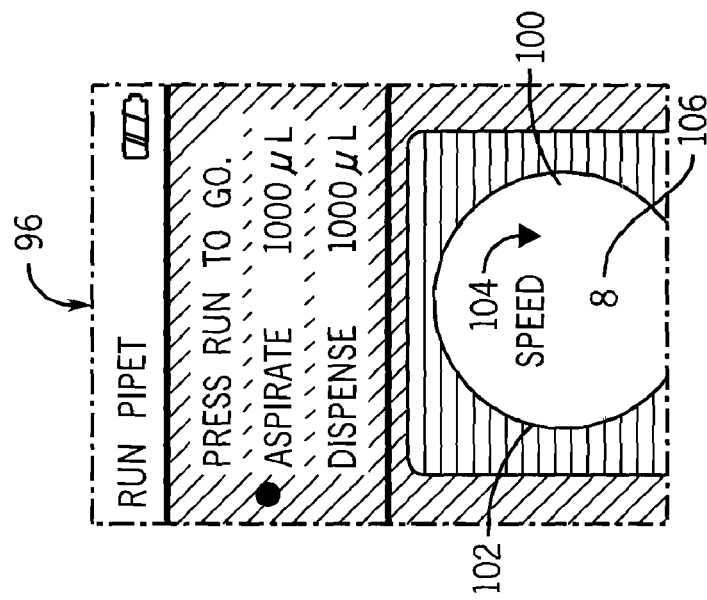
FIGS. 5A and 5B show "RUN" screens in which the user is able to adjust pipetting speed in accordance with a preferred embodiment of the invention.
Figure 5A:
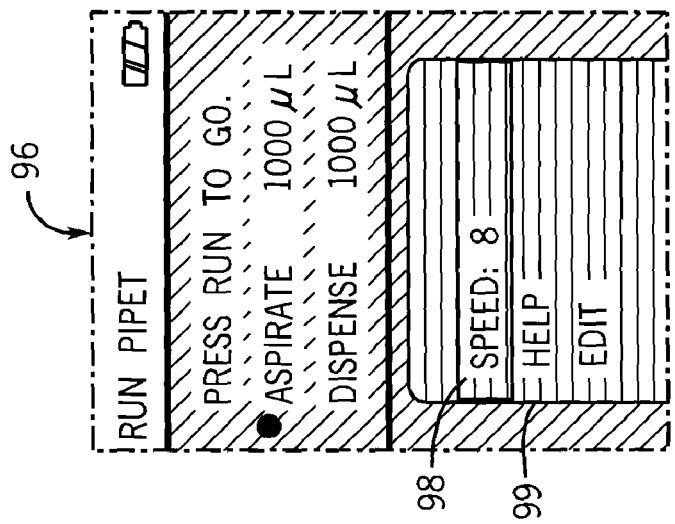

FIGS. 5a and 5b show the run pipette screen 96 and in Run Pipette. Referring to FIGS. 5A and 5B, using the touch pad control 30, the user may change the aspiration speed, access the help function, or can enter the edit screens to change the aspirate volume. FIG. 5A shows the speed selection 98 highlighted (box 99), and FIG. 5B shows a pop up graphic 100 that is displayed once "speed" 98 has been selected using the "OK" button 48 on the touch pad control 30. Referring to FIG. 5B, the speed selection pop up 100 includes a graphical display of a gauge 102. The gauge 102 includes a pointer 104 that moves in response to the user's control of the circular touch pad 46 in order to adjust the relative pipetting speed from a minimum value or slowest value of 1 to a maximum or fastest value of 10. The selected speed is also shown in alphanumeric characters 106. The selected speed is set for the pipettor 10 by pressing the enter button 48 on the touch pad control 30. Preferably, when the aspiration or dispensing speed is changed, the setting is used for all subsequent functions. However a user can change the pipetting speed at any time. In accordance with known pipetting techniques, viscous samples should be aspirated and dispensed at the slowest speeds to ensure accurate pipetting, whereas dispensing of a liquid at a faster speed allows for crisp liquid delivery especially when one is not able to "touch off." Once the relative pipetting speed has been changed, the pipettor 10 controls pipetting speed preferably in accordance with the manner described in the above incorporated co-pending patent application entitled "Electronic Pipettor Assembly."

As depicted by the shading in FIGS. 5A and 5B, the background color for the Run Pipet screen 96 is green, as it is preferably for the run menus for all pipetting modes 72, 74, 76, 78, 80, 82, 84, 86, 88 and 90. It is desirable to use color coding to distinguish run screens from help screens and edit screens.

Figure 6A:
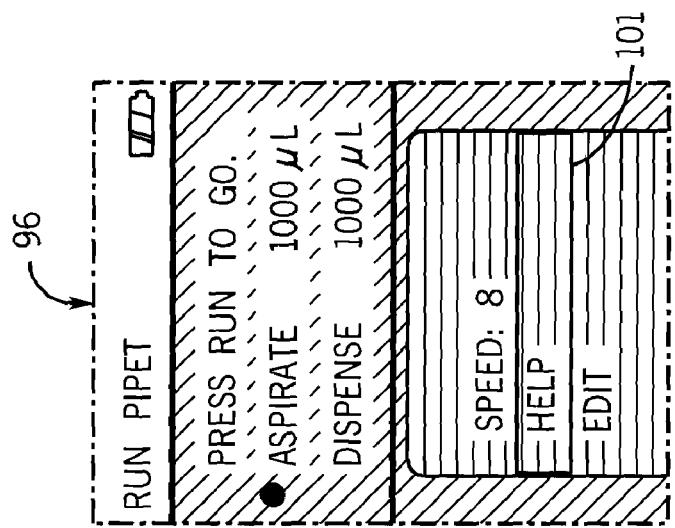
FIGS. 6A and 6B show how to access the "HELP" function via a "RUN" screen and an example "HELP" screen, respectively.
Figure 6B:
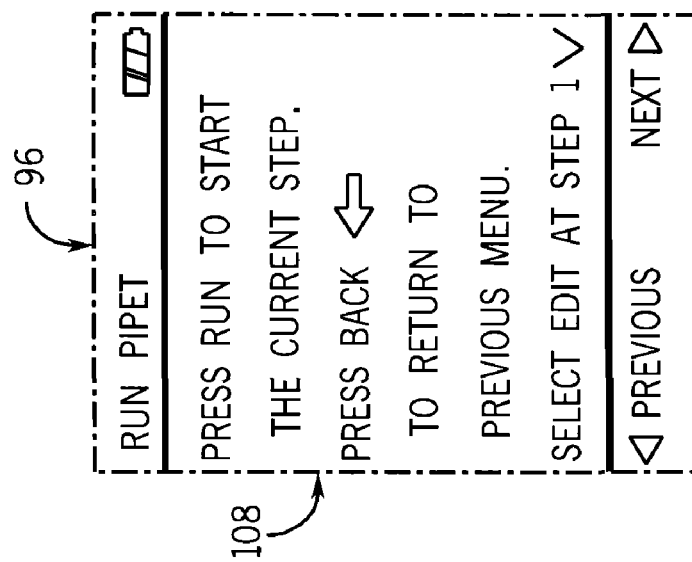

Referring to FIG. 6A and 6B, the help function can be accessed from the Run Pipet screen 96. FIG. 6A shows the "help" selection highlighted, box 101, and the user can obtain help for running the "PIPET" mode 72 by pressing the "OK" button 48 on the touch pad control 30. FIG. 6B is an example of the help screen 108 that appears on the display 32 when help is selected from the Run Pipet screen 96. As depicted by the shading in FIGS. 6A and 6B, the background color for the help screen 108 is white, as it is preferably whenever any other help screen is displayed. Note that the text 108 in FIG. 6B explains to a user how to use the pipet mode 72. It should be understood that an explanation of how to use the other respective pipetting modes 74, 76, 78, 80, 82, 84, 86, 88 and 90 would be explained on the help screen 108 if another mode were selected from the main menu. On the other hand, the help function can be accessed from other screens to provide other types of information that may be useful to the user when running a particular procedure.

Figure 7B:
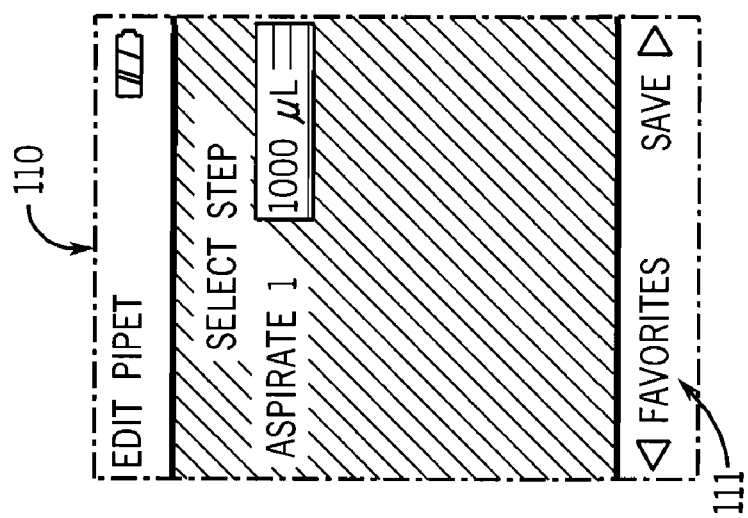
FIGS. 7A-7C are "EDIT" screens, in accordance with the preferred embodiment of the invention, showing the selection and editing of volumes for a particular step in a pipetting protocol.
Figure 7A:
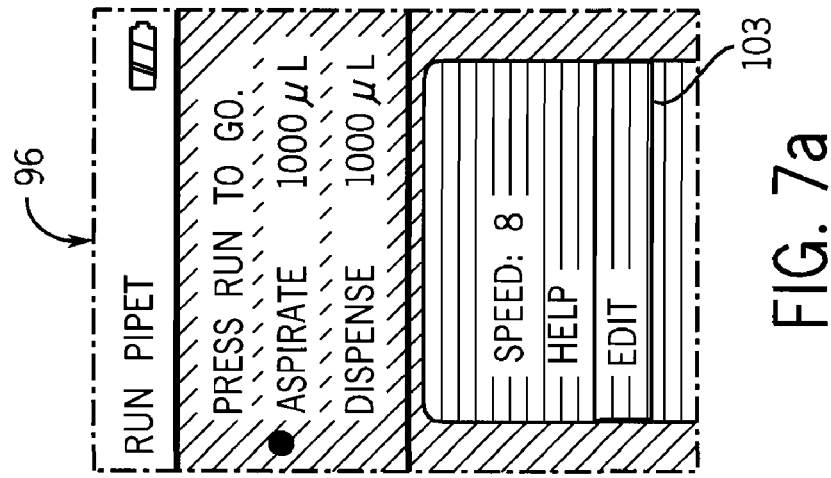

FIG. 7a shows the "edit" selection highlighted, box 103, from the Run Pipette screen 96. By choosing the "edit" function, the user enters the Edit Pipette screen 110, FIGS. 7b and 7c. As depicted by the shading in FIG. 7B, the background color for the edit screen 110 is gray, as it is preferably whenever any other edit screen is displayed. Referring to FIG. 7B, the screen 110 indicates the aspiration volume for which the pipettor is set, i.e. 1000 µL in FIG. 7B. The user can change the volume in one of two ways, the user can select a volume from the list of favorites 111 by selecting the left navigation button 54 on a circular touch pad, or the user can use the enter button 48 on the touch pad control 30 to bring up the pop up screen 113 in FIG. 7C.

Figure 7C:
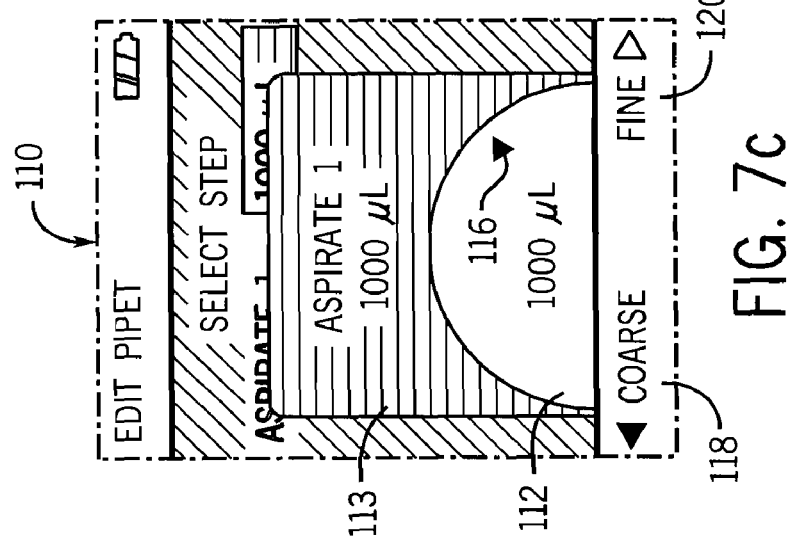

Referring to FIG. 7C, the volume selections are graphically displayed on the pop up screen 113 using a graphical gauge 112 as well as alpha numeric characters 114. The graphical gauge 112 includes a pointer 116 that points to a volume selected by the user between the minimum aspiration volume for the pipettor 10 and the maximum aspiration volume for the pipettor 10. The screen 110 also includes a coarse setting 118 and a fine setting 120. The user selects the coarse setting by pressing navigation button 54 on the circular touch pad 46 or the fine setting 120 by pressing the right navigation button 52 on the circular touch pad 46. The user selects the desired volume using the rotational movement on the circular touch pad 46. The coarse setting 118 changes the volume in larger increments than the fine selection 120. The increment sizes are based on the size of the pipettor. Preferably, the full volume range from the minimum volume to the maximum volume can be obtained by less than 3 and ½ rotations, and preferably less than 3 rotations, of the circular touch pad 46 on the touch pad control 30. It is also preferable that the volume scale wraps around upon itself meaning that when a user exceeds the maximum volume the displayed volumes will automatically wrap to the minimum volume, or vice versa. The following table (Table 1) indicates preferred volumes for the coarse and fine increments depending on pipettor size.

TABLE 1

| Pipettor Size | 5000 | 1250 | 300 | 125 | 12.5 |
|---|---|---|---|---|---|
| Maximum Program Volume | 5000 | 1250 | 300.0 | 125.0 | 12.5 |

TABLE 1-continued

| Minimum Program Volume | 100 | 50 | 10.0 | 5.0 | 0.5 |
|---|---|---|---|---|---|
| Scrolling Volume Fine | 5 | 1 | 0.5 | 0.1 | 0.01 |
| Scrolling Volume Coarse | 100 | 25 | 10.0 | 2.5 | 0.25 |
| Display Decimal Points | 0 | 0 | 1 | 1 | 2 |

Figure 8B:
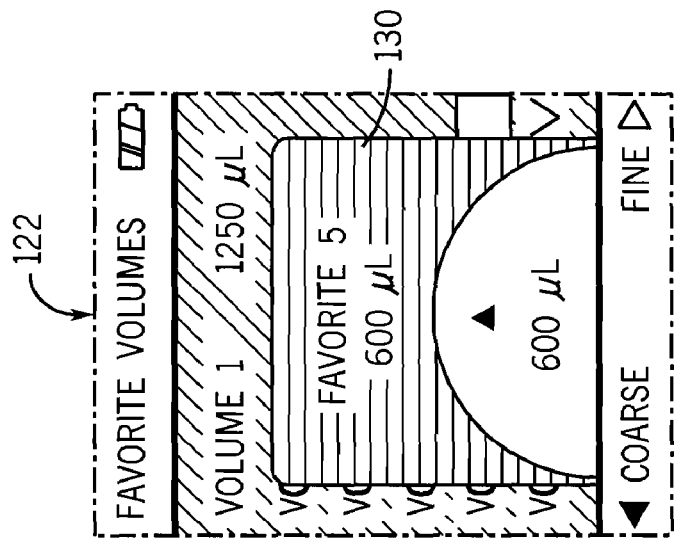
Figure 8A:
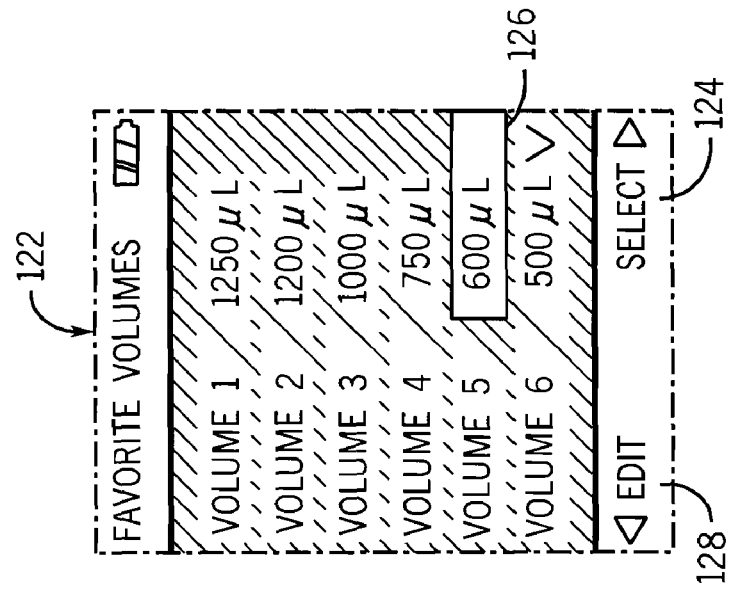

FIG. 8 shows the "favorite volumes" screen 122. Preferably, the software allows the user to define, save and select from about 10 favorite volumes. The touch pad control 30 is used to select the favorite volume number, volume 1, volume 2, volume 3, etc. for which the user desires to either select or edit. The display 122 indicates at arrow 124 that the user can select the highlighted volume, box 126, e.g. "Volume 5 600 µL", by pressing the right navigation button 52 on the circular touch pad 46. On the other hand, the display 122 indicates at arrow 128 that the user can edit the volume associated with that particular favorite selection by pressing the left navigation button 54 on the circular touch pad 46. FIGS. 8B and 8C show the editing pop up screen 130 for the setting favorite volumes. FIG. 8B shows the pop up screen 130 as it initially would appear when the left navigation button 54 is pressed with "Volume 5" highlighted (as shown by box 126 in FIG. 8A on the screen 122). FIG. 8C shows that the user has adjusted the favorite volume either using the coarse setting or the fine setting from 600 µL to 650 µL.

Note that, in the "PIPET" mode 72, only the aspiration volume and the pipetting speed can be programmed. Generally speaking, the programming of speeds and volumes is preferably the same for the other modes 74, 76, 78, 80, 82, 84, 86, 88 and 90. As mentioned, once the "PIPET" mode 72 is fully programmed, the user places the pipettor 10 so that the tip 14 is located in the liquid sample, and presses the run button 18 to initiate aspiration. The user then moves the pipettor to the receiving receptacle and presses the run button 18 again to implement a full dispense.

FIGS. 9A-9E show screens 60, 134, 136 that relate specifically to the "REPEAT DISPENSE" mode 74. FIG. 9A shows the main menu 60 with the "REPEAT DISPENSE" mode highlighted, see box 132. The Run RepeatDisp screen 134, FIG. 9B is displayed when the "REPEAT DISPENSE" mode is chosen from the main menu 60. On the Run RepeatDisp screen 134 in FIG. 9B, the user can select to change speed (menu item not shown in FIG. 9B), change pace 144, access "help" 145, or edit other variables 146. Speed setting is preferably implemented the same as described above. Box 147 in FIG. 9b shows the "edit" function highlighted for selection.

FIG. 9C shows the Edit RepeatDisp screen 136 which is displayed when the edit feature 146 is selected from the Run RepeatDisp screen 134 in FIG. 9B. The variables associated with the "REPEAT DISPENSE" mode 74 are displayed on the Edit RepeatDisp screen 136, namely Dispense 148, Last Dispense 150 and Count 152.

If dispense volume 148 is selected from the Edit RepeatDisp screen 136, the user can either select a favorite volume by pressing the left navigation arrow 54 on the circular touch pad 46 or edit the dispense volume by pressing the right navigation key 52 on the circular touch pad 46, generally in the same manner as described above with respect to FIGS. 7B-C or 8A-8C. Note that the Edit RepeatDisp screen 136 includes notation 153 for favorites and 154 for saving a selected value. The favorite volume selection is accomplished in the same manner as described above with respect to FIGS. 8A-8C, whereas the selection of a non-favorite volume is accomplished in accordance with the procedure shown in FIGS. 7A and 7B. The Edit RepeatDisp screen 136 also includes a selection for the volume of the Last Dispense 150 which is chosen in accordance with the software in the same or similar manner as the Dispense volume 148. The Edit RepeatDisp screen 136 also includes a selection for Count 152 which is the number of aliquots dispensed having the Dispense volume 148, but not including a count for the Last Dispense volume 150. In the "REPEAT DISPENSE" mode 74, the software automatically calculates the aspiration volume based on the values entered for the Dispense volume 148 of the aliquots, the Last Dispense volume 150 and the Count 152. Referring to FIGS. 9D and 9E, the value for the Count 152 is edited by using the circular touch pad 46 to highlight the count value 152 (as shown by box 155 in FIG. 9D) and then pressing the OK button on the circular touch pad 46 to cause the count pop up screen 156 to appear. The pop up screen 156, 9E, has a graphical gauge 157 that allows the user to select a count between 1 and a maximum value which is determined by the software depending on the volume of the pipettor and the minimum aliquot volume. For example, for a 1250 μl pipettor, the minimum aliquot volume is 50 μl, and the max count would be 24 because the count does not include the Last Dispense volume. Note that it is preferred that the Edit RepeatDisp screen 136 provide an error message if the information regarding the desired volumes and/or count are illegal.

Referring again to FIG. 9B, the Run RepeatDisp screen 134 also allows the user to select the pace 144, or the time duration between dispensing successive aliquots. The pace feature is implemented when the user presses and holds the run button 18 and the pipettor 10 dispenses multiple programmed volumes (i.e. dispense volume 148 with the selected pace 144 between each dispense). Releasing the run button 18 stops the paced dispense. Pressing the run button 18 again will continue dispensing at the selected pace. The pipettor 10 preferably sends a warning beep when the last dispense volume or waste volume containing the accumulated error from all the prior dispenses is reached. At that point, the run button 18 is pressed and held to empty the final waste amount. As shown in FIGS. 4A and 4B, the "REPEAT DISPENSE" mode 74 and the "VARIABLE DISPENSE" mode 84 include the pace option 63.

In the preferred embodiment, four pace intervals are available: none, slow, medium, and fast. When the pace is set at none, the user must press the run button 18 to initiate each dispense. Referring to FIGS. 9F and 9G, the user can reset the pace by selecting "pace" 158 on the Run RepeatDisp screen 134 as shown by box 138 in FIG. 9F. When the user selects pace 138, a pop up 159 with a graphical gauge 160 appears on the Run RepeatDisp screen 134. The graphical gauge 160, like the gauge for the volume adjustment or the speed adjustment, includes a pointer 162 which the user can move using the circular touch pad 46 from the minimum pace which is none to the fastest pace. The graphical gauge 160 also displays the pace that the pointer is representing in alphanumeric characters 164. The user selects the pace by pressing the "OK" button 48 on the touch pad control 30.

Table 2 shows the function-based program modes 72, 74, 76, 78, 80, 82, 84, 86, 88, 90 which are programmed into the preferred pipettor operating software, as well as the various editable parameters.

TABLE 2

| | | | | | Options | | | | | | | | |
| --- | --- | --- | --- | --- | --- | --- | --- | --- | --- | --- | --- | --- | --- |
| | | | | | | | Volumes | | | | | | |
| Modes | Speed | Help | Edit | Pace | Aspirate | Air Gap | Dispense | Last Disp. | Mix | Direction | Count | Mix Cycles | Rows |
| Pipet | X | X | X | | X | | | | | | | | |
| Repeat Dispense | X | X | X | X | | | X | X | | | X | | |
| Sample Dilute | X | X | X | | X | X | | | | | | | |
| Pipet/Mix | X | X | X | | X | | | | X | | | X | |
| Manual Pipet | X | X | X | | X | | | | | X | | | |
| Reverse Pipet | X | X | X | | X | | | X | | | | | |
| Variable Dispense | X | X | X | X | | | X | | | | X | | |
| Variable Aspirate | X | X | X | | X | | | | | | X | | |
| Sample Dilute/Mix | X | X | X | | X | X | | | X | | | X | |
| Serial Dilution | X | X | X | | X | | | | X | | | X | X |

Note that the speed, help and edit functions are available for each mode. Volume selections for aspirating, dispensing, last dispense, air gap and mix are required for the various pipetting modes 72, 74, 76, 78, 80, 82, 84, 86, 88, and 90, as needed. As discussed, it is preferred that volume error messages be displayed when a volume entered exceeds the maximum possible volume, which may be a specific entered aspirate volume, or may be an aspiration volume based on information calculated by the pipettor software. The software error checking routine will not allow a user to save an illegal program but will allow the user to continue to program even if the current program is illegal.

The pace feature is used for the "REPEAT DISPENSE" mode 74 and the "VARIABLE DISPENSE" mode 84. The direction feature is used for the "MANUAL PIPET" mode 80. The count feature is used for the "REPEAT DISPENSE" mode 74, the "VARIABLE DISPENSE" mode 84, and the "VARIABLE ASPIRATE" mode 86. The mix cycles option is used in the "SAMPLE DILUTE/MIX" mode 88, Pipet/Mix mode 78 and the serial dilution mode 90. And the rows option is used in the "SERIAL DILUTION" mode 90. The various functional modes 72, 74, 76, 80, 82, 84, 86, 88 and 90 are now discussed in greater detail.

The "REPEAT DISPENSE" mode 74 is used for fast reagent addition to multiple vessels or wells from one source container. In the "REPEAT DISPENSE" mode 74, the pipettor 10 dispenses a large aspirated volume of liquid via multiple aliquots to multiple targets, e.g. to fill an entire microplate quickly. Aspiration overfill and motor reversal, in order to ensure the accuracy of the dispensed aliquots, is preferably automatic.

Figure 9H:
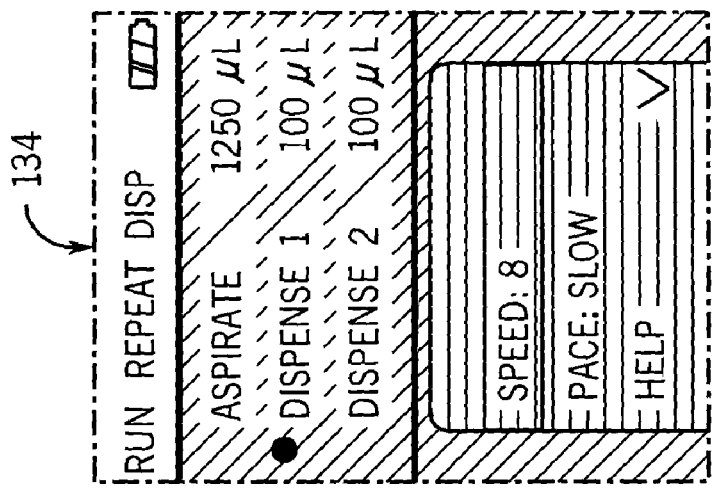
Figure 9G:
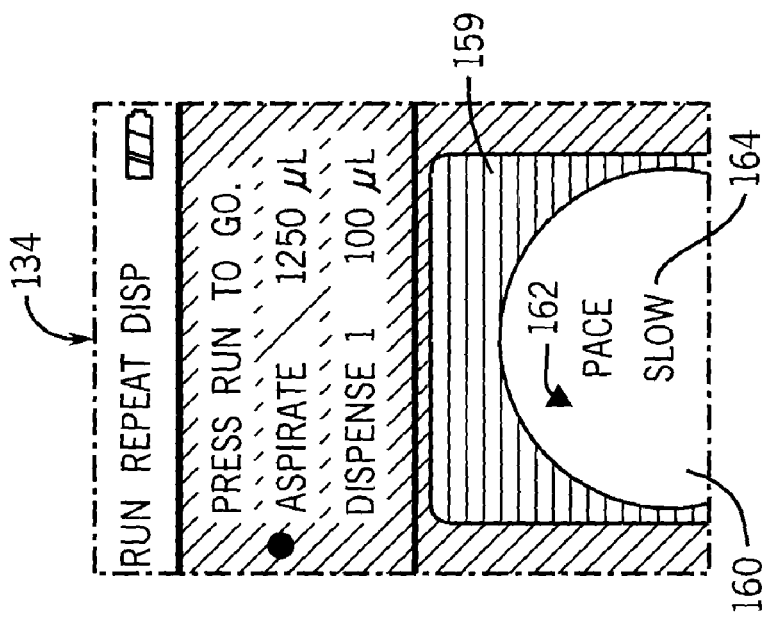
Figure 9F:
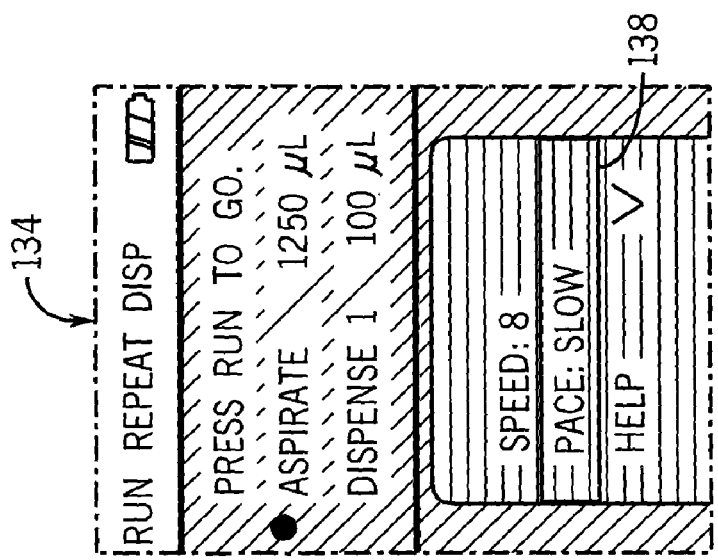

Referring to FIGS. 9B and 9H, to run a "REPEAT DISPENSE" mode cycle, the user presses and releases the run button 18 to initiate the initial aspirate step, FIG. 9B. Once the liquid has been fully aspirated, the user again presses the run button 18 to begin dispensing, see FIG. 9H, and holds the run button to execute paced successive dispensing of aliquots, as mentioned above. The dispense number for the respective aliquot is shown on the display 134 (FIG. 9 H), and stops incrementing when the pipettor 10 is ready to purge the calculated waste volume amount (i.e., Last Dispense). Preferably, the pipettor 10 provides a warning beep when it reaches the Last Dispense. The last dispense aliquot contains the accumulated error from all of the prior dispenses. The user can chose to use the last dispense or discard it.

As described in connection with FIGS. 9B and 9H, the run screens preferably display the steps of the selected procedure while the procedure is executing. Preferably, the step that is presently waiting to be executed or being executed is highlighted, e.g. with a dot in front of the step as shown in FIGS. 9B and 9H, with the following step being listed below the current step. After the first step in a procedure has been completed, and before the last step has been started, it may be desirable to show three steps of the procedure, namely the immediately previous step, the current step and the next step.

The "SAMPLE DILUTE" mode 76, FIG. 4, is used to accomplish accurate sample dilutions by using a dilutant to chase small sample volumes from the pipette tip. The dilutant is first aspirated into the tip, followed by an air gap which is then followed by a small volume of aspirated sample liquid. The air gap keeps the liquids separated in the tip which can help minimize carryover contamination. When the "SAMPLE DILUTE" mode 76 is selected from the main menu 60, a Run SampleDilute screen is displayed (not shown) which allows the user to run the pipettor 10 in "SAMPLE DILUTE" mode by pressing the run button 18, or alternatively adjust pipetting speed, access the help function, or enter the edit mode to set the dilute volume, air gap volume and sample volume. The volumes are preferably selected in the same manner as described in connection with FIGS. 7A, 7B, and 7C or by selecting a favorite which can be selected and/or reset, as shown in FIGS. 8A-8C. Once programmed, execution of the "SAMPLE DILUTE" mode 76 is initiated by pressing and releasing the run button 18 to initiate the aspiration of the dilutant into the pipette tip 14. Then the pipet tip 14 is removed from the liquid to initiate the aspiration for the air gap, again by pressing and releasing the run button 18. Next, the tip 14 is placed in the sample liquid and the run button 18 is pressed again to aspirate the sample. Finally, the entire content of the tip 14 is dispensed together by pressing the run button 18. Preferably, the "SAMPLE DILUTE" mode 76 is programmed to perform a two step blowout, as with the "PIPET" mode 72.

The "PIPET/MIX" mode 78, FIG. 4, is similar to the "PIPET" mode 72 in that identical volumes are aspirated and dispensed, but the "PIPET/MIX" mode 78 incorporates a mix option after dispensing. Mixing occurs automatically after the single dispense step. As shown in FIG. 4 and in Table 2, the user can program not only the aspirate volume as in the "PIPET" mode 72, but also the mix volume and the number of mix cycles. During operation, after the sample has been dispensed into a receptacle, the mixing sequence occurs automatically without pressing the run button 18 while the tip remains in the receptacle.

Figure 10B:
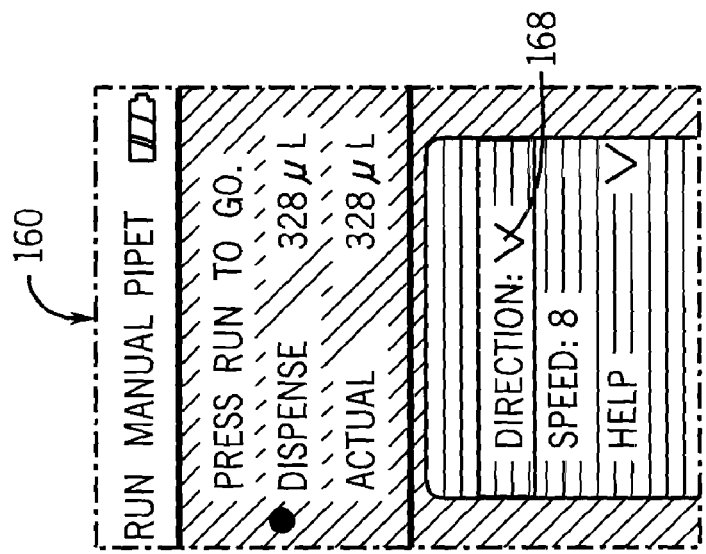
FIGS. 10A and 10B are programming screens relating to the "MANUAL PIPET" mode, which show the change of "DIRECTION" option.
Figure 10A:
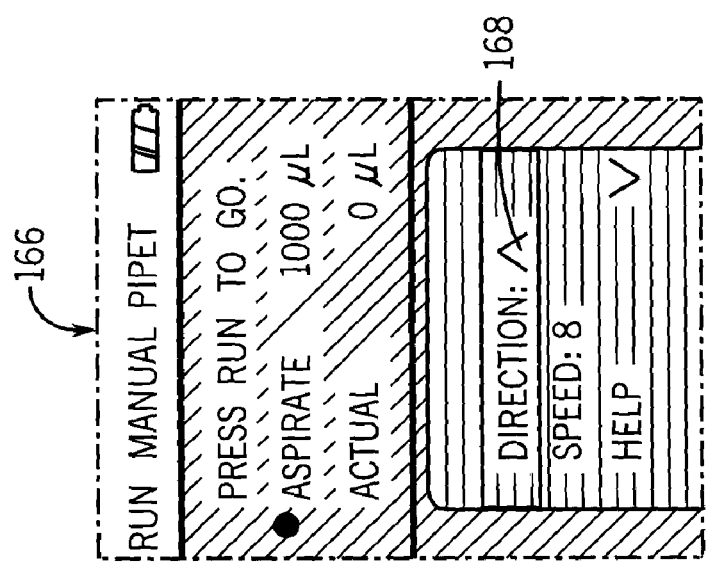

When the "MANUAL PIPET" mode 82 is selected from the main menu 60, FIG. 4, the Run ManualPipet screen 166 shown in FIGS. 10A and 10B is displayed. The "MANUAL PIPET" mode 80 is used when the aspiration volume is not clearly defined or well known. In the "MANUAL PIPET" mode 80, the user manually controls volume during aspirate and dispense steps, and can view on the screen 166 how much liquid has been aspirated or remains to be dispensed. This mode 80 may be useful, for example, when performing titrations. From the Run ManualPipet screen 166 the user can adjust pipetting speed and pipeting direction (i.e. aspirating or dispensing) or can enter edit mode to adjust the maximum aspirate volume. Adjusting speed and volume is preferably executed in substantially the same manner as discussed previously. Slower pipetting speeds (1-5) should be used for better control and resolution in this mode 80, especially when dispensing. The change of pipetting direction is shown in FIGS. 10A (aspirate) and 10B (dispense). In FIG. 10A, a direction arrow 168 faces upward, indicating that the pipettor 10 is set to aspirate when the user presses the run button 18. In FIG. 10B, the direction arrow 170 faces downward, indicating that the pipet is in dispense mode. When aspirating, the motor stops when the user releases the run button 18 or when the programmed maximum aspirate volume is reached. The user then changes pipetting direction so that the pipettor 10 dispenses when the user presses the run button 18, see FIG. 10B. As the pipettor 10 dispenses when the user presses the run button 18, the volume remaining in the tip is actively displayed, FIG. 10B.

The "REVERSE PIPET" mode 82 is also similar to the "PIPET" mode 72, except that the user must program an aspirate volume and a last dispense volume. The last dispense volume indicates the amount of liquid left in the tip after the initial dispense, which accumulates pipetting error as described above. In the "REVERSE PIPET" mode 82, the user can repeat aspirate and dispense cycles multiple times, keeping the last volume (with the accumulated error) in the tip. There is no blowout in the "REVERSE PIPET" mode 82 after a normal dispense step, in order to prevent introduction of air into the sample. The aspiration lookup table is used for the aspiration stroke whereas the dispense lookup table is used for the dispense stroke as disclosed in the above incorporated co-pending patent application entitled "Electronic Pipettor Assembly" , now U.S. Pat. No. 7,540,205. In this manner, when multiple aspiration and dispense cycles are implemented, the accumulated error resides in the last dispense volume. To dispense the selected aspirate volume without blowout, keeping the last dispense volume in the tip, the user presses and holds the run button 18. Upon release of the run button 18, the user can then aspirate the programmed volume again by using the run button 18. Preferably, to stop the aspirate and dispense process and to purge the last dispense volume, the user presses and releases the run button 18 at the start of any dispense step. During the last dispense, it is preferred that the software be programmed to allow the user to perform a two step blowout by pressing and holding the run button 18.

In the "VARIABLE DISPENSE" mode 84 the user can select the pace of dispense, and can also edit the count and the dispense volume for the respective count. These selections are executed generally in the same manner as described previously, with the minor exception that a separate dispense volume must be programmed for each count. The "VARIABLE DISPENSE" mode 84 is used for repeat dispensing of multiple volumes, and aspiration volume is automatically calculated. This mode 84 is helpful, for example, when multiple reagent or dispense volumes are required for setting up a dilution series.

After the pipettor 10 has been programmed, the user executes the "VARIABLE DISPENSE" mode by pressing and releasing the run button 18 to initiate the initial aspirate step. Once the sample is aspirated, the user then presses and holds the run button 18 to execute paced dispenses of the programmed dispense volumes, or the user can press and release for each successive dispense step. The display will show a dispense "count" number, which stops incrementing when ready to purge the calculated waste volume amount, i.e. last dispense. Again, the pipettor 10 preferably sends a warning beep when the waste volume containing accumulated error from all the prior dispenses is reached. At that point, the user presses and holds the run button 18 to empty the final waste amount.

The "VARIABLE ASPIRATE" mode 86, FIG. 4, is used for sequentially aspirating (in the same tip) more than one programmed volume followed by a single dispense. In this mode, the user can program speed, count and aspirate volume for the respective count. This mode 86 can be used in a variety of collection applications where the aspiration volume is well known, for example, it is well suited for supernatant collection in microwell plates or test user vials.

To operate in "VARIABLE ASPIRATE" mode 86, the pipette tip 14 is placed in a liquid, and the user presses and releases the run button 18 to initiate the first aspiration volume. The pipettor tip 14 is then moved to the same or different liquid and the run button is pressed and released to initiate aspiration of the second aspiration volume. This process repeats as programmed by the user. After the number of programmed aspiration steps has been completed, the user can press and hold the run button 18 to perform a full dispense including a two step blowout.

The "SAMPLE DILUTE/MIX" 88 is a combination of the "SAMPLE DILUTE" mode 76 followed by a mix cycle as described above in connection with the "PIPET/MIX" mode 78.

The "SERIAL DILUTION" mode 90, FIG. 4, enables aspiration of a specific volume followed by a mixing sequence and ending with the original aspirate volume in the tips. This mode is used to perform serial dilutions in plates, vials or tubes. Once programmed, the run button 18 on the pipettor 10 is pressed and released to initiate the aspiration. After aspiration, the run button is pressed and released to then start the dispense and mix sequence. This procedure is continued for multiple rows as programmed. Preferably, row and mix cycles are tracked on the display for the run menu. Mix cycles are shown in one color, for example red when mixing. Each cycle notation is shown with two numbers, such as 2 mix 2, the first number being the row counter, and the second number being the mix cycle. A dot on the row number indicates the active program step.

In addition to the functional program modes 72, 74, 76, 78, 80, 82, 84, 86, 88, 90 having predetermined algorithms, the pipettor 10 also preferably provides a custom programming mode 92, or "CUSTOM" mode 92, FIG. 4C. In a preferred embodiment, the custom programming mode 92 allows for the creation and storage of multi-step pipetting protocols using four basic functions of aspirate, mix, dispense and purge. The user can create and store a number of custom programs in memory, e.g. up to ten custom programs. Preferably, each program contains no more than a predetermined maximum number of steps, for example, 50 verifiable steps. Each of the programs is automatically assigned names such as Custom 1, Custom 2, etc. If the pipettor 10 is equipped with a PC communication device, such as a wireless Bluetooth communication device, the custom programs may preferably be stored and recalled from the PC and/or used on different pipettors 10.

Figure 11A:
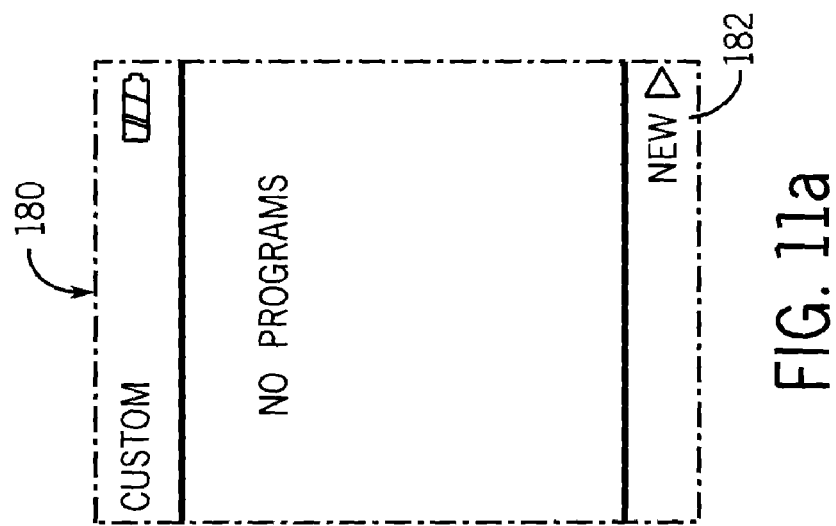
FIGS. 11A-11D are programming screens relating to the creating and editing of custom pipetting programs.
Figure 11D:
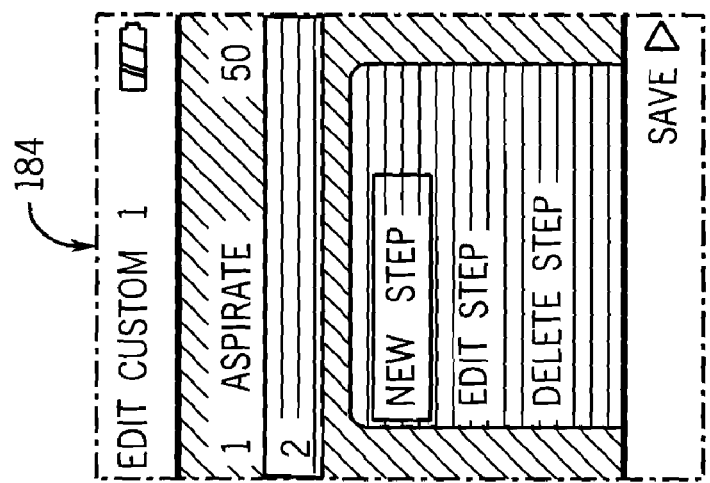
Figure 11C:
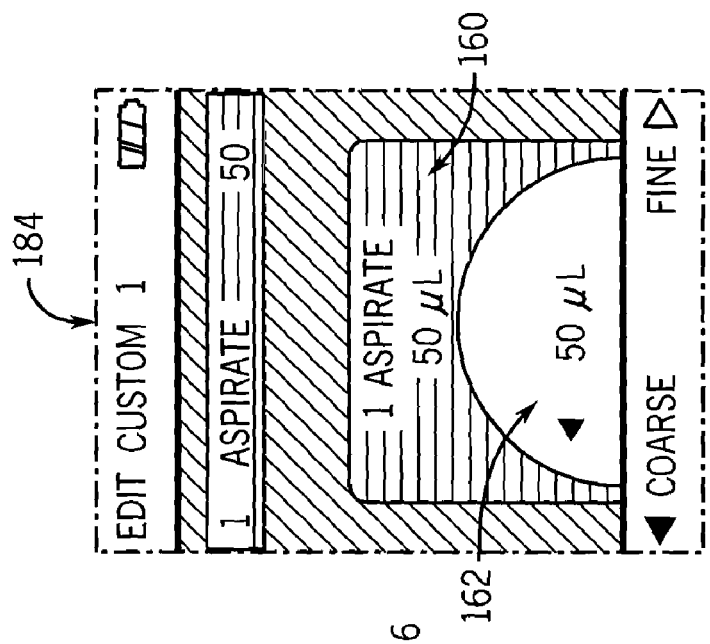
Figure 11B:
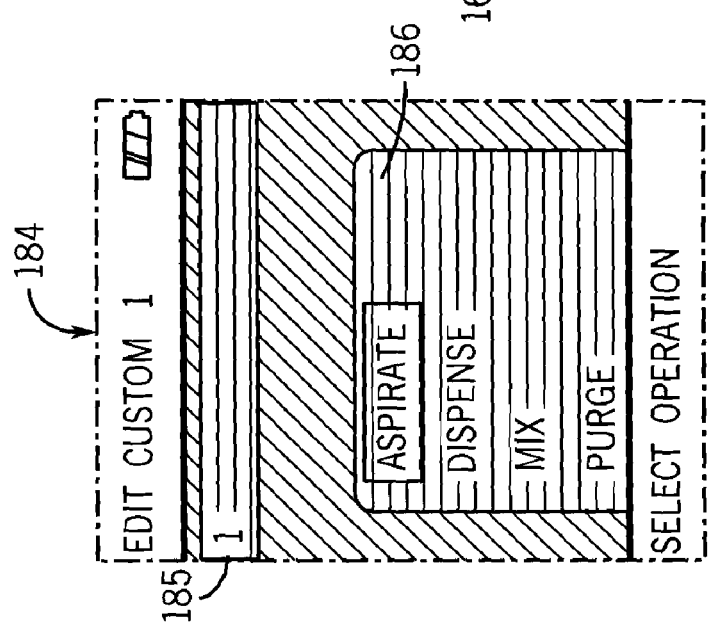

In the "CUSTOM" mode 92, each program must begin with either an aspirate or a mix command. To create and save a new custom program, the user uses the touch pad control 30 to select the "CUSTOM" mode 92 from the main menu 60 so that the main Custom screen 180 is displayed, as shown in FIG. 11A. The user then presses the right navigation button 52 on the pipettor 10, as indicated by arrow 182, to bring up a custom programming edit screen, e.g. the Custom 1 screen 184 in FIG. 11B. The program is assigned a name automatically, e.g., Custom 1 (but this can be changed by the user using a keypad function as described below or using the PC communication device). Using the touch pad control 30, the user selects the first step 185 in the custom program (as indicated by the highlighted area 186 in FIG. 11B), which as mentioned must be either aspirate or mix, and then presses the OK button 48 on the touch pad control 30. The edit screen 184 in FIG. 11C shows that the first step in the example custom program is an aspirate step, and further illustrates a pop up screen 190 with a volume setting gauge 192 for the aspirate volume of the first step. After the first step has been programmed, the custom edit screen 184 in FIG. 11D shows that the first step (1 aspirate 50) has been entered and is prompting the user to enter the new step, edit the previous step or delete a previous step. If the "New Step" option is chosen from the menu in FIG. 11D, the user again uses the touch pad to select the next step in operation: aspirate, dispense, mix or purge as shown in FIG. 11B, and sets the appropriate volumes as shown in FIG. 11C. If the user desires to edit a previous step, the touch pad control 30 is used to select the step in the operation which it would like to edit and then again to select the "Edit Step" option in FIG. 11D. The software then returns to essentially the procedure in FIGS. 11B and 11C to edit the particular step.

Figure 12C:
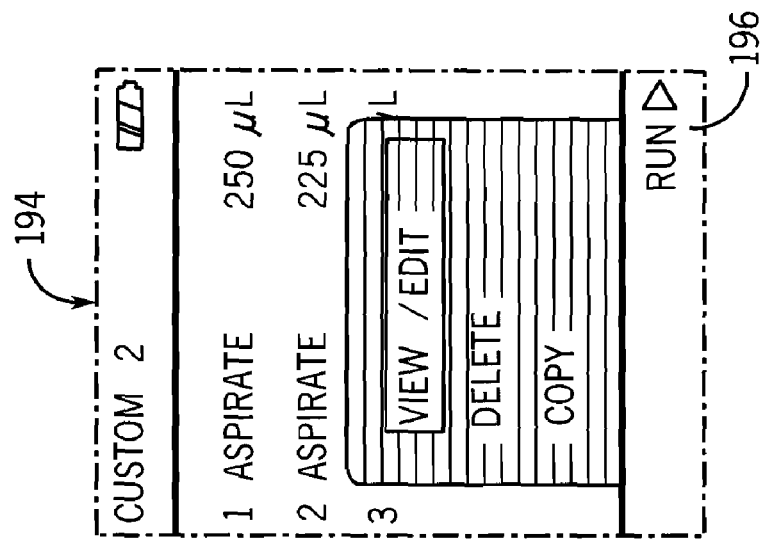
FIGS. 12A-12C are example "RUN" screens for custom pipetting programs.
Figure 12B:
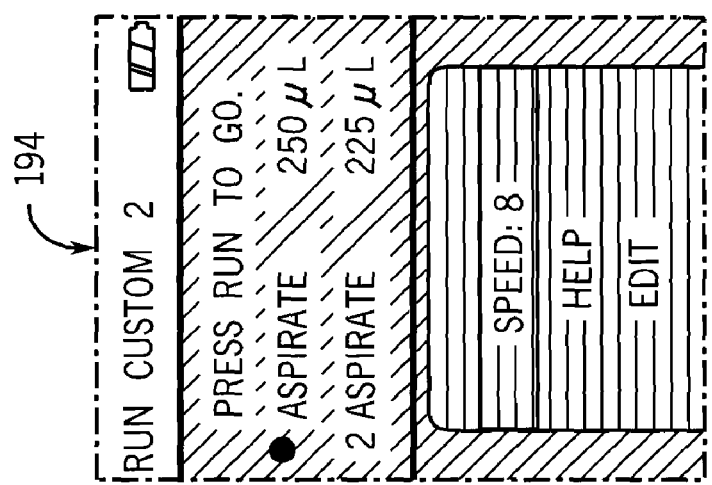
Figure 12A:
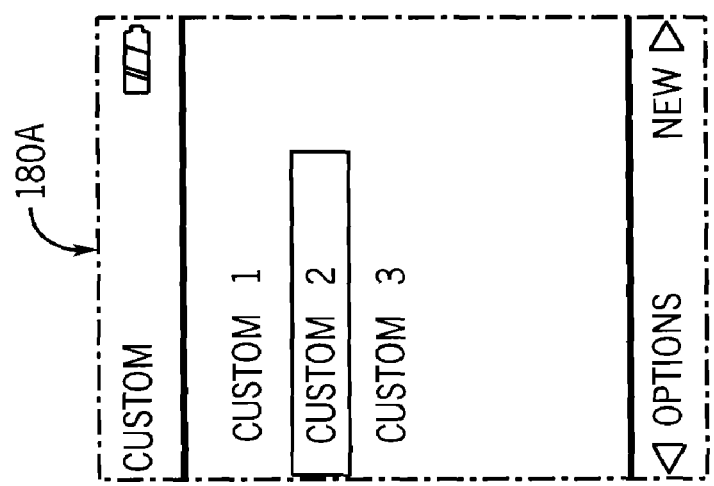

In order to run a custom program, the user selects the "CUSTOM" mode 92 from the main menu 60 to display the main Custom screen 180A, which is shown in FIG. 12A with three custom programs, namely "CUSTOM 1" "CUSTOM 2" "CUSTOM 3." The user selects one of the custom programs using the touch pad control 30 by pressing OK to bring up the respective custom run screen 194, e.g., the Run Custom to screen 194 shown in FIG. 12b. The user then presses and releases the run button 18 to initiate the first program step in the custom program. Alternatively, the user can edit pipetting speed, enter program editing mode, or access the "help" function as shown in FIG. 12b. Once set, the run button 18 can be pressed and released to initiate the first program step. The left navigation button 54 can also be pressed by the user to select Options for custom programs as indicated in FIG. 12a. Referring to FIG. 12c, the view/edit feature allows the user to review and change that specific custom program if desired; the delete feature allows the user to delete the specific custom program; and the copy feature allows the user to copy the specific custom program. When the user chooses to run a custom program as depicted in FIG. 12b, the run screen 194 displays pipetting steps of the current program with a dot indicating the current step to be executed upon activation of the run button 18. The run button 18 is used to initiate all pipetting steps in generally the same manner as the function-based modes 72, 74, 76, 78, 80, 82, 84, 86, 88 and 90.

It is preferable that the software include limits or rules constraining the custom programming of the pipettor 10. For example, it may be desirable that each and every program have a final step in which a message to purge is automatically flashed on the display. Or, for example, if the combination of aspirate and dispense volumes is not possible, the pipettor can either be programmed to make necessary adjustments or simply indicate that an error has been made.

Also shown in FIG. 4 is the "TOOL BOX" option 94 which, in the preferred embodiment, allows the user to select various submenus, namely "Preferences", "Calibration and Service", "Wireless", and "Owner Information", and "Help". Under the "Preferences" submenu, the user can select beep tones for step completion, program completion, the purge key or when there is an error message, etc. The user can also set the display, for example, wallpaper or the like, as well as the display dimming time and turnoff time. Preferably, the software has a start up screen which flashes for a few or several seconds upon start up. The start up screen is preferably programmable such that it can contain a manufactures logo or personalized pictures or information, which can be used for example for system identification. As mentioned in the above incorporated co-pending patent application entitled "Electronic Pipettor Assembly", now U.S. Pat. No. 7,540,205, the preferred pipettor 10 includes at least one megabyte of flash memory. This flash memory is well suited for storing information or pictures or logos for a start up screen. Preferably, the start up screen is displayed when the pipettor 10 is being recharged. The ability to personalize may be desirable for example in laboratories having recharging stands for multiple pipettors 10. Further, from the "Preferences" submenu, the user can select which function-based modes 72, 74, 76, 78, 80, 82, 84, 86, 88 and 90 it wishes to display on the main menu 60. For example, it may wish to turn off one or more of the modes 72, 74, 76, 78, 80, 82, 84, 86, 88 and 90.

The "Calibration" submenu preferably includes: reminders or timers for when calibration is required, a service history, and functional calibration routines. Any suitable calibration routine may be implemented, for example, the shifting of the aspirate and/or dispense tables in the flash memory in accordance with validated bench top calibration protocol.

The "Wireless" submenu includes software enabling the use of a communications device, such as a Bluetooth wireless communication device with a PC.

The "Owner Information" submenu includes software that allows the user to input user information such as name and address and to observe the instrument's serial number. Preferably, the "Owner Information" screen includes a keyboard display of alpha numeric characters which can be individually selected, entered and edited by navigating the keyboard display with the touch pad control.

The preferred embodiment of the invention has been described above. It should be understood that various features of the invention may be used in pipettors not embodying all the features described herein.

We claim:

1. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein the touch pad control includes a circular touch pad which allows the user to select a desired volume by rotating their thumb or finger around the circular touch pad in either a clockwise or counter-clockwise direction, and the pipettor further has a coarse setting and a fine setting wherein the user can navigate the entire range of available values for volume selection with less revolutions using the coarse setting than the fine setting.

2. A hand-held electronic pipettor as recited in claim 1 wherein the full range of volume selections can be reached in less than three and one half revolutions under the coarse setting.

3. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein the software can be programmed to store one or more favorite volume selections in computer memory.

4. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein steps of a selected pipetting mode or custom routine are shown on the display while the procedure is running, such that after the first step has been completed and before the last step has been started at least three steps of the procedure are displayed, the displayed steps being the previously completed step, the current step and the next step.

5. A hand-held electronic pipettor as recited in claim 4 wherein the software for each pipetting mode includes edit screens which allow the user to edit variables relevant to the selected pipetting mode, run screens which instruct the user on a step-by-step basis through the routine, and help screens which provide the user access to explanations on how to execute the selected program.

6. A hand-held electronic pipettor as recited in claim 5 wherein each of the edit screens has the same predominant background color, each of the run screens also has a predominant background color which is different than the predominant background color for the edit screens, and each of the help screens also has a predominant background color which is different than the predominant background color for the edit screens and the run screens.

7. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein volume selections are graphically displayed on the user interface display and the software controls the graphically displayed volume selections using a graphical gauge that indicates available volumes for said volume selections ranging from a minimum value to a maximum value for the pipettor, and the user scrolls to a desired volume using the touch pad control; and
further wherein a desire total count value of successive aspirating or dispensing steps for a given procedure are graphically displayed on the user interface display and the software controls the graphical display of the desired count value, at least in part, using a graphical gauge from which the user selects the desired count using the touch pad control, and yet further wherein the desired total count value corresponding to the position of the graphical gauge is shown in alphanumeric characters.

8. A hand-held electronic pipettor as recited in claim 7 wherein available selections for relative pipetting speed are graphically displayed on the user interface display and the software controls the graphically displayed pipetting speed selections using a graphical gauge that indicates available relative pipetting speed selections ranging from a minimum value to a maximum value, and the user scrolls to a desired relative pipetting speed using the touch pad control.

9. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein the software includes a pace selection which sets the time duration between repeating dispenses when the run button us activated, and the pace selection includes at least the following settings: none, slow, medium and fast, which are graphically displayed on the user interface displayed and can be selected or edited by the user via the touch pad control.

10. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein volume selections are graphically displayed on the user interface display and the software controls the graphically displayed volume selections using a graphical gauge that indicates available volumes for said volume selections ranging from a minimum value to a maximum value for the pipettor, and the user scrolls to a desired volume using the touch pad control.

11. A hand-held electronic pipettor as recited in claim 10, wherein a desired total count value of successive aspirating or dispensing steps for a given procedure are graphically displayed on the user interface display and the software controls the graphical display of the desired count value, at least in part, using a graphical gauge from which the user selects the desired count using the touch pad control, and further wherein the desired total count value corresponding to the position of the graphical gauge is shown in alphanumeric characters.

12. A hand-held electronic pipettor as recited in claim 10 wherein the display indicates the scrolled to value for the volume selections via a graphical pointer.

13. A hand-held electronic pipettor as recited in claim 12 wherein the display indicates the scrolled to value for the volume selections is also displayed via alphanumeric characters.

14. A hand-held electronic pipettor comprising:
an elongated body adapted to be held in the hand of a user;
a touch pad control located on a front side of the body to be operated by the user;
a run button located on the pipettor to be operated the user;
a user interface display located on the front side of the pipettor above the touch pad control;
a microprocessor; and
menu-driven software for controlling information displayed on the user interface display and for programming the microprocessor to operate the pipettor;
wherein available selections for relative pipetting speed are graphically displayed on the user interface display and the software controls the graphically display pipetting speed selections using a graphical gauge that indicates available relative pipetting speed selections ranging from a minimum value to a maximum value, and the user scrolls to a desired relative pipetting speed using the touch pad control.

* * * * *